(12) United States Patent  
Holmberg et al.

(10) Patent No.: US 7,194,181 B2
(45) Date of Patent: Mar. 20, 2007

(54) ADAPTER BLOCK INCLUDING CONNECTOR STORAGE

(75) Inventors: Matthew Holmberg, Le Center, MN (US); James J. Solheid, Lakeville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/095,033

(22) Filed: Mar. 31, 2005

(65) Prior Publication Data
US 2006/0228086 A1 Oct. 12, 2006

(51) Int. Cl.
G02B 6/00 (2006.01)

(52) U.S. Cl. ...................... 385/135; 385/134
(58) Field of Classification Search ............... 385/135
See application file for complete search history.

(56) References Cited

U.S. PATENT DOCUMENTS

| 4,747,020 | A | 5/1988 | Brickley et al. |
| 4,995,688 | A | 2/1991 | Anton et al. |
| 5,214,735 | A | 5/1993 | Henneberger et al. |
| 5,497,444 | A | 3/1996 | Wheeler |
| 5,717,810 | A | 2/1998 | Wheeler |
| 5,758,003 | A | 5/1998 | Wheeler et al. |
| 6,160,946 | A | 12/2000 | Thompson et al. |
| 6,532,332 | B2 | 3/2003 | Solheid et al. |
| 6,537,106 | B1 | 3/2003 | Follingstad |
| 6,591,051 | B2 * | 7/2003 | Solheid et al. .......... 385/134 |
| 6,760,531 | B1 | 7/2004 | Solheid et al. |
| 6,792,191 | B1 * | 9/2004 | Clapp et al. .......... 385/135 |
| 6,980,725 | B1 * | 12/2005 | Swieconek .......... 385/135 |
| 6,983,095 | B2 * | 1/2006 | Reagan et al. .......... 385/135 |
| 2004/0264873 | A1 | 12/2004 | Smith et al. |
| 2005/0002633 | A1 | 1/2005 | Solheid et al. |
| 2005/0129379 | A1 | 6/2005 | Reagan et al. |
| 2005/0281526 | A1 * | 12/2005 | Vongseng et al. .......... 385/135 |
| 2006/0093301 | A1 | 5/2006 | Zimmel et al. |

* cited by examiner

Primary Examiner—Sung Pak
(74) Attorney, Agent, or Firm—Merchant & Gould P.C.

(57) ABSTRACT

A fixture includes an adapter array with movable adapter modules and a storage panel. A housing of a connector holder includes a plurality of openings for receiving fiber optic connectors and protecting the polished end face of the connectors from damage while the connectors are stored within the storage panel. Each of the connectors are inserted within the openings in the connector holder for storage and protection until the cables need to be connected to a customer equipment cable in the adapter array. The fixture is used in a cabinet including fiber optic splitters. Offset vertical fingers are provided on the fixture for cable management.

8 Claims, 30 Drawing Sheets

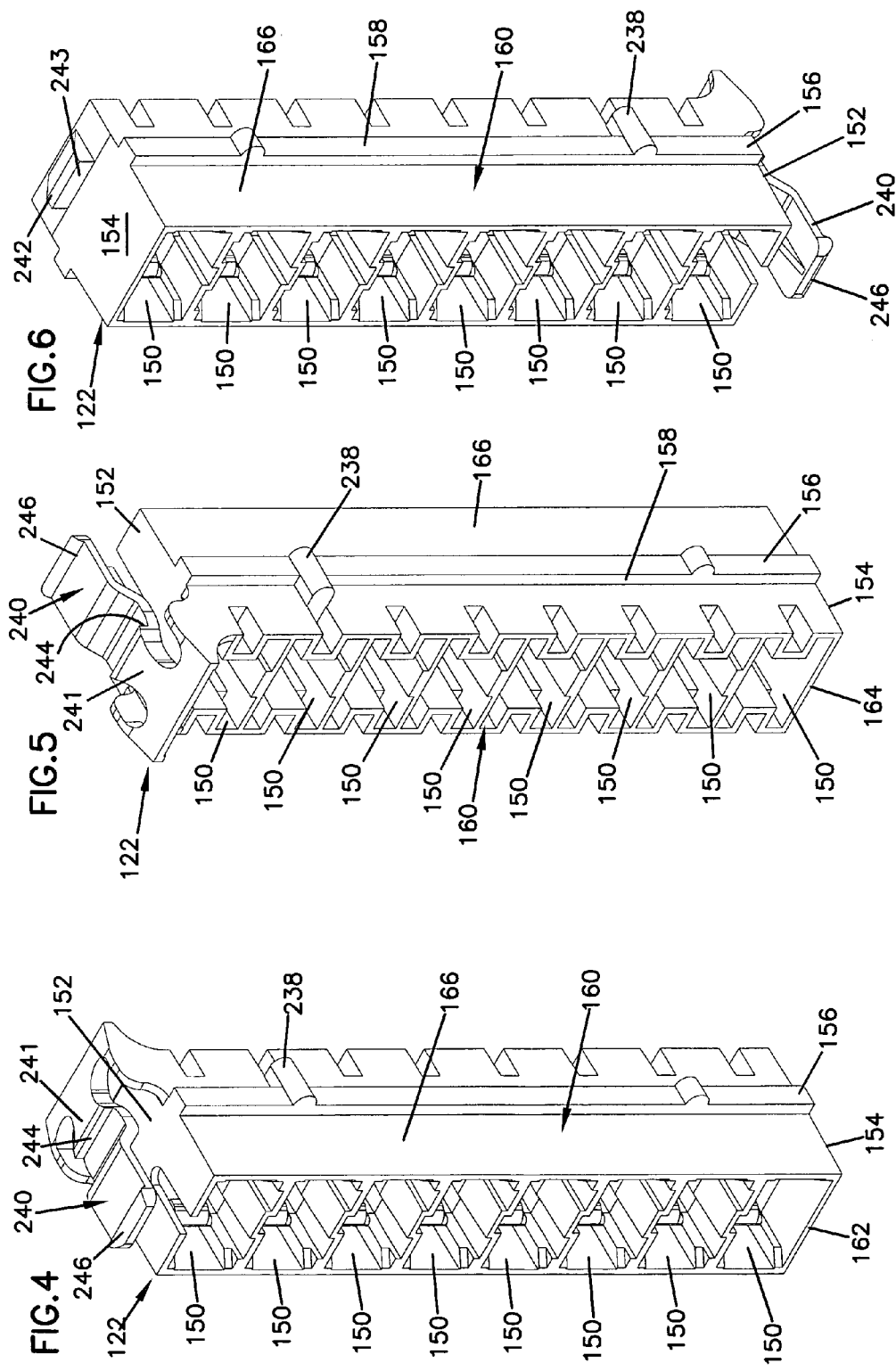

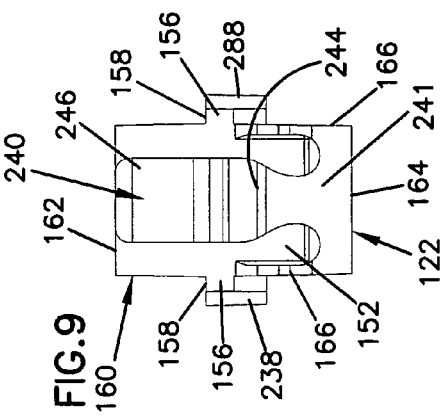
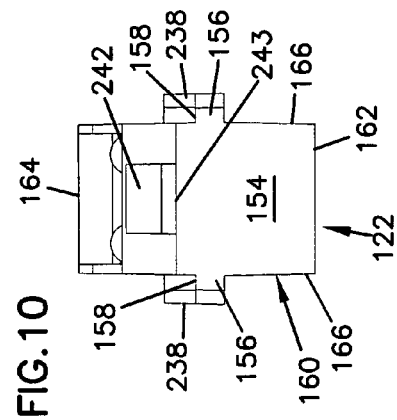
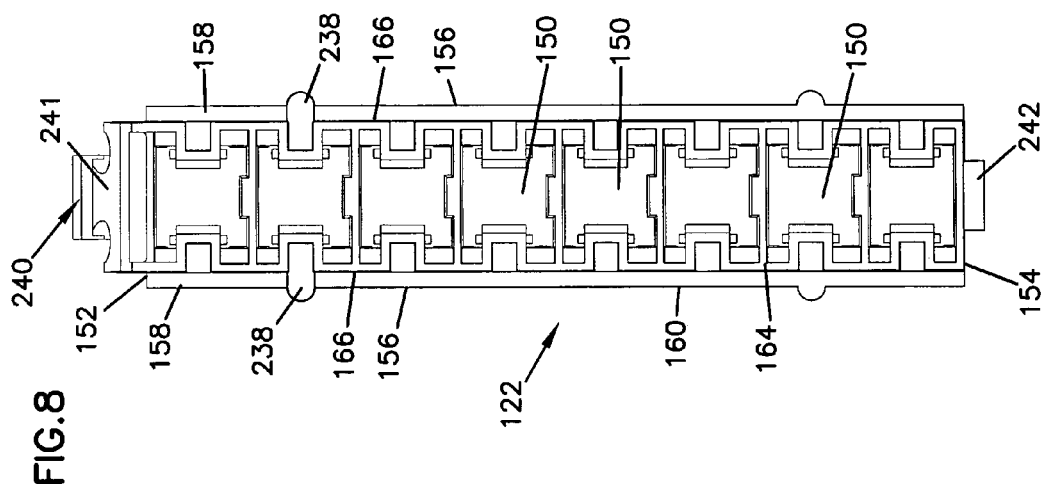
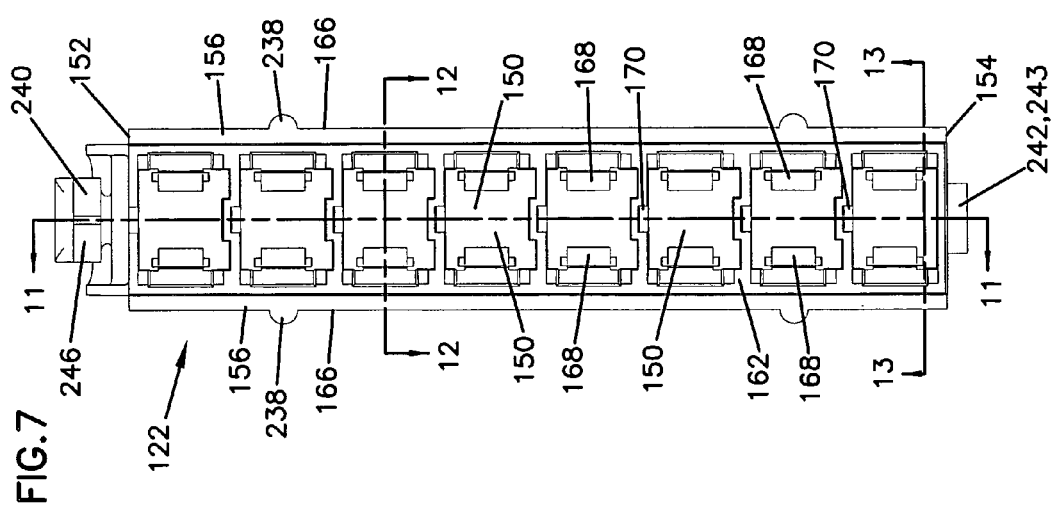

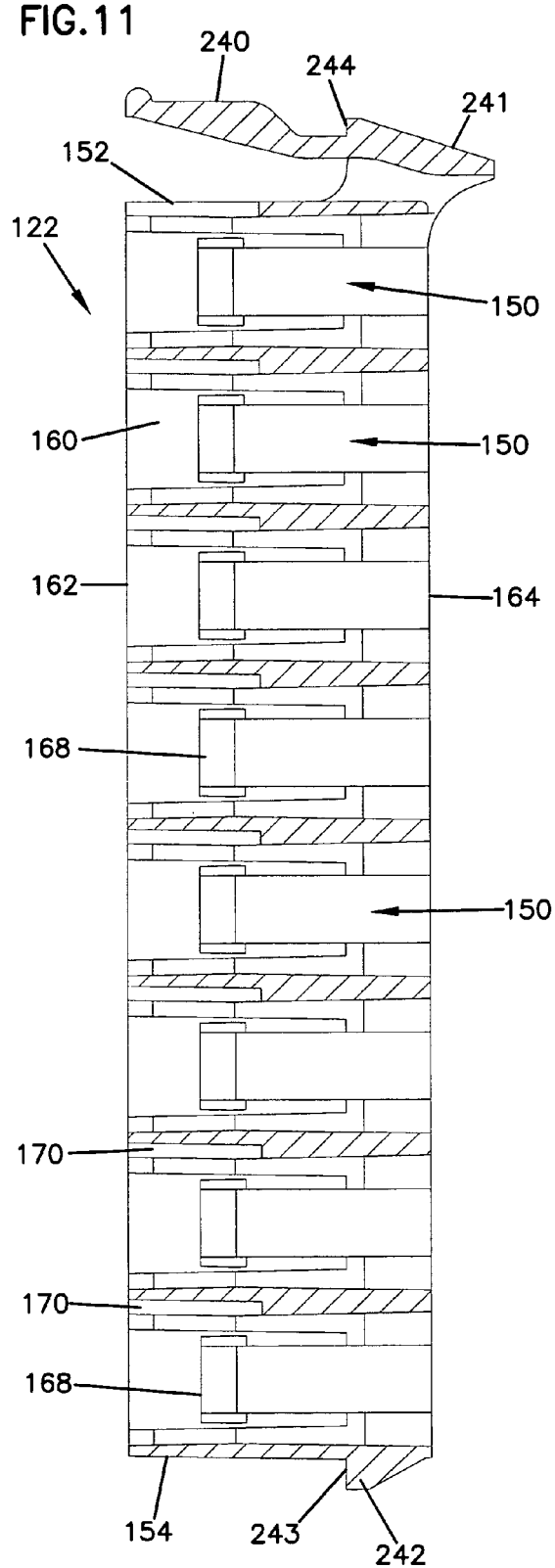
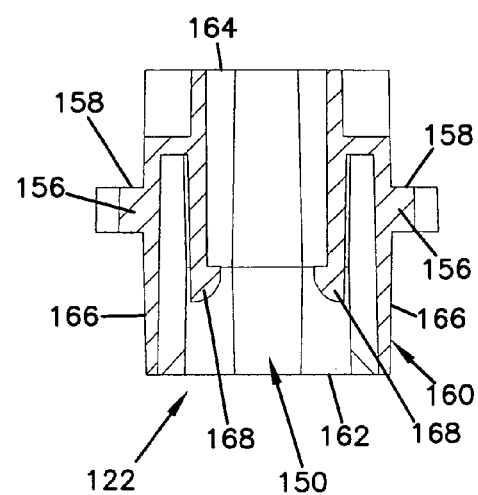
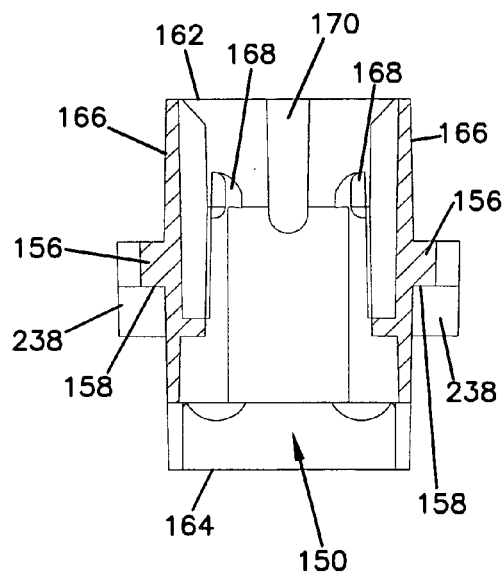

ADAPTER BLOCK INCLUDING CONNECTOR STORAGE

RELATED APPLICATIONS

This application is related to application Ser. No. 10/871,555 filed Jun. 18, 2004, the disclosure of which is hereby incorporated by reference.

FIELD

The present invention relates generally to fiber optic telecommunications connection devices. More specifically, the present invention relates to fixtures and cabinets for fiber optic connectors.

BACKGROUND

Fiber optic connectivity and service is being extended to more and more customers, both commercial and residential. However, not all customers to whom this service is available are currently ready to accept and utilize such service. Additionally, new service and connection devices may be provided in residential or commercial real estate development projects but at a time prior to when the units are constructed or ready for occupancy. In such circumstances, it is desirable to have an easily scalable solution for aiding connection of new customers to existing connections within a piece of installed connection equipment and expansion of the number of connections available within that installed equipment.

SUMMARY

The present invention relates to a telecommunications equipment cabinet including a splitter connecting an outside plant cable to a plurality of fiber optic cables. The cabinet includes a splitter mounting area, a cable management structure, an array of adapters for optically connecting two fiber optic cables terminated with connectors, and an excess cable storage area. Customer equipment cables are connected to adapters within the adapter array. Cables from the splitter are directed to the cable management structure and to the excess cable storage area where connectors terminating these cables are stored and protected until a connection between the outside plant cable and the customer equipment cable is desired. The adapter array preferably includes sliding rows of adapters for selective access to the adapters for connecting and disconnecting connectors.

The present invention relates to a connector holder with at least one opening in a housing for receiving a fiber optic connector and protecting a polished end face of the connector. The connector holder includes a housing with a releasable latch on one end and a mounting tab on the other end which cooperate to releasably mount the housing within an opening in a bulkhead or storage panel. Preferably, the storage panel is positioned in a fixture including an array of movable adapters for connecting the connectors to other connectors.

The present invention still further relates to a method of increasing the connection capacity of a fiber optic telecommunications connection cabinet. A splitter is mounted in the cabinet and a cable from the splitter is connected to an outside plant cable. The splitter splits an optical signal from the outside plant cable into a plurality of optical fiber cables terminated with optical fiber connectors. This plurality of cables is directed from the splitter to a cable management area and to an excess cable storage area. A plurality of connectors of these cables are inserted within a connector holder and the connector holder is inserted within a mounting opening in the excess cable storage area. The cabinet includes an array of adapters which may be used as needed to connect a cable from the splitter to a customer equipment cable. The array of adapters is mounted for movement along lines of travel parallel to groups of adapters arranged in lines.

The present invention also relates to a cable communications cable management system including a fixture and a plurality of modules mounted on the fixture. Each of the modules is movably mounted on the fixture for movement along a line of travel. Each one of the modules includes a plurality of adapters for holding a fiber optic connector. Each adapter has opposite ends for coupling to a fiber optic cable connector. Each one of the adapters is movable with one of the modules along the line of travel. The plurality of adapters is linearly disposed along the line of travel for each of the modules. A connector storage panel is positioned adjacent to a front of the fixture. The connector storage panel defines a plurality of openings for receiving connectors for storage when not connected to adapters of the plurality of modules. In some preferred embodiments, the fixture includes a vertical arrangement of cable management fingers directing cables to the adapters. The vertical arrangement preferably includes at least two sets of fingers offset from one another in the horizontal direction.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 4 is a front perspective view of a multi-position fiber optic connector holder according to the present invention.

FIG. 5 is a rear perspective view of the multi-position fiber optic connector holder of FIG. 4.

FIG. 6 is a second rear perspective view of the multi-position fiber optic connector holder of FIG. 4.

FIG. 7 is a front view of the multi-position fiber optic connector holder of FIG. 4.

FIG. 8 is a rear view of the multi-position fiber optic connector holder of FIG. 4.

FIG. 9 is a top view of the multi-position fiber optic connector holder of FIG. 4.

FIG. 10 is a bottom view of the multi-position fiber optic connector holder of FIG. 4.

FIG. 11 is a side cross-sectional view of the multi-position fiber optic connector holder of FIG. 7, taken along line 11—11.

FIG. 12 is a cross-sectional view of the multi-position fiber optic connector holder of FIG. 7, taken along line 12—12.

FIG. 13 is a second cross-sectional view of the multi-position fiber optic connector holder of FIG. 7, taken along line 13—13.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
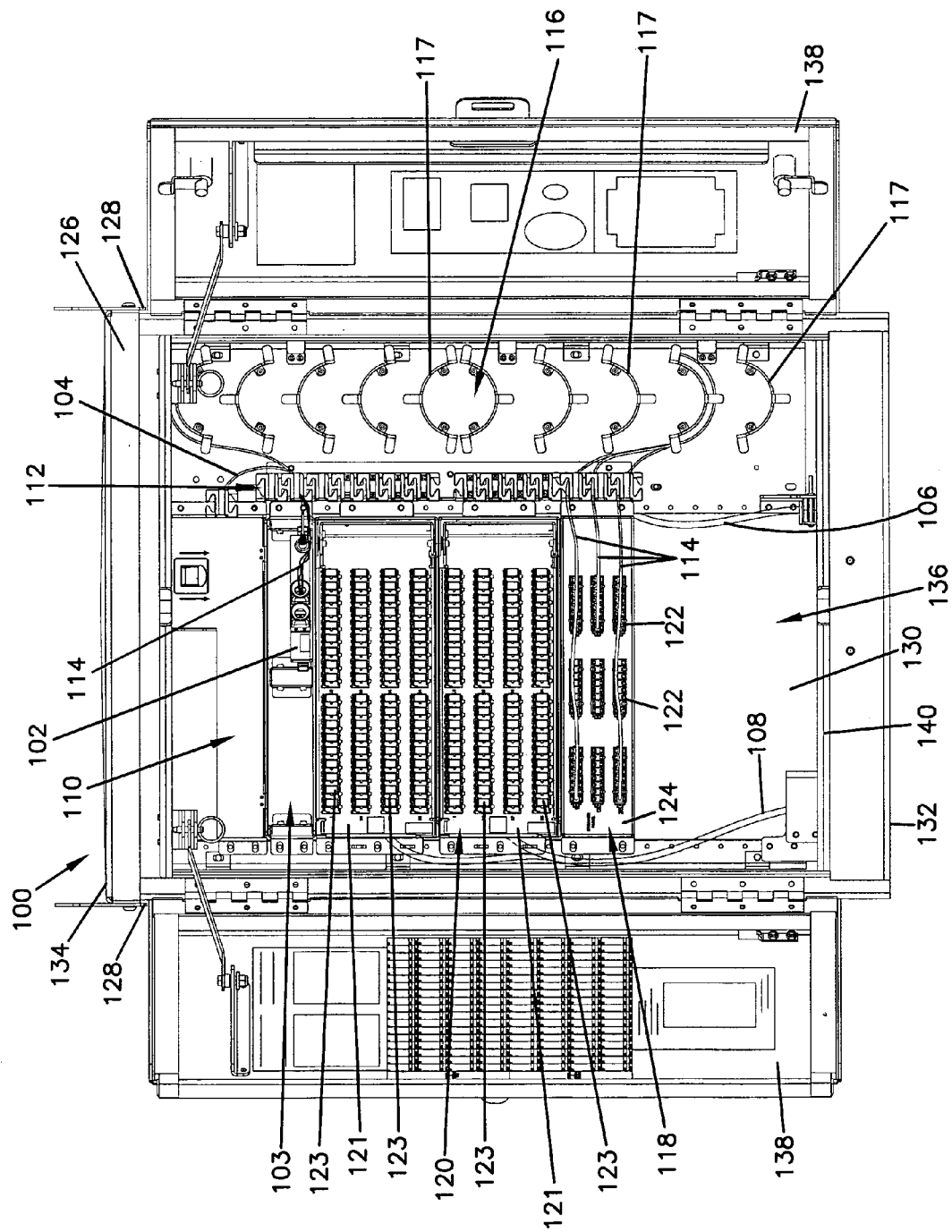
FIG. 1 is a front view of a fiber optic telecommunications connection cabinet including a multi-position fiber optic connector holder according to the present invention, with only illustrative cables shown to indicate routing.

FIG. 1 shows a telecommunications connection cabinet 100 such as might be mounted on a pedestal or other mount in an area where fiber optic connectivity for customers is desired. Cabinet 100 provides a location for outside plant fiber optic cables to be connected to fiber optic distribution cables. The distribution cables are then lead to customer equipment to provide fiber optic service and connectivity at the customer's location. A typical arrangement for providing service to customers might include utilizing a splitter to break the signal from an outside plant (OSP) cable into a plurality of distribution cables, each distribution cable providing a connection to a particular piece of customer equipment. A common splitter might separate the optic signal within the OSP cable into thirty-two individual signals and also combine those thirty-two signals into the OSP cable in a bi-directional communication configuration. Cabinet 100 is similar in nature to that disclosed in the commonly-owned U.S. patent application Ser. No. 10/613,764, filed on Jul. 2, 2003, entitled "Telecommunications Connection Cabinet," the disclosure of which is incorporated herein by reference.

A plurality of cables 108 connected to the customer equipment may be directed into cabinet 100. One or more OSP cables 106 may be directed into cabinet 100 to a splice arrangement, such as a splice tray or panel 110. OSP cables 106 may be spliced within splice panel 110 to a secondary cable 104. Secondary cable 104 is directed from splice panel 110 to a first cable management structure 112 and led to a splitter 102 within a splitter mounting area 103. Splitter 102 separates the optical signal transmitted over OSP cable 106 and secondary cable 104 into up to thirty-two signals directed into an equal number of fiber distribution cables 114. Cables 114 are directed from splitter 102 through cable management area 112 and into a second cable management and slack storage area 116 including a plurality of cable slack storage spools 117. From slack storage area 116, cables 114 may be directed to either a connector holder within an excess cable storage area 118 or to an adapter within an adapter array 120. Each of these cables 114 are preferably terminated with a fiber optic connector.

Within excess cable storage area 118, a plurality of connector holders 122 are installed within mounting slots in a bulkhead 124. Connector holder 122 (described in further detail below) includes a plurality of openings for receiving and releasably holding the fiber optic connector. The openings in connector holder 122 preferably do not provide a continuous optical path but rather house and protect a polished end face of an optical fiber within each cable 114 which is mounted to the terminal fiber optic connector. This protection may be provided in combination with an endcap, such as shown in commonly-owned U.S. patent application Ser. No. 10/610,325, filed on Jun. 30, 2003, entitled "Fiber Optic Connector Holder and Method," the disclosure of which is incorporated herein by reference. Alternatively, connector holder 122 may enclose and protect the polished end face of the connector terminating cable 114 without the need for a protective endcap.

Within adapter array 120, a plurality of fiber optic adapters 123 are mounted which receive the connector terminating cable 114. The connector of cable 114 is received within an opening in a front side of an adapter 123. Adapter 123 also includes an opening on an opposite rear side which is adapted to receive a connector terminating one of the customer equipment cables 108. Adapters 123 within adapter array 120 may optically connect one of the cables 114 to one of the cables 108, for transmission of an optical signal from OSP cable 106 to the customer equipment connected to that cable 108. Such cable terminating connectors and adapters 123 are well known in the industry. As shown in FIG. 1, the connectors are SC connectors and it is anticipated that other types, formats, styles and sizes of telecommunications connectors may be used.

Cabinet 100 includes a front 126, a pair of opposing sides 128, a rear wall 130, a base 132 and a top 134, all cooperating to define an interior 136 within which the various components described above are mounted. The components are accessible through an opening 140 in front 126 which may be closed off by a pair of doors 138.

Figure 2:
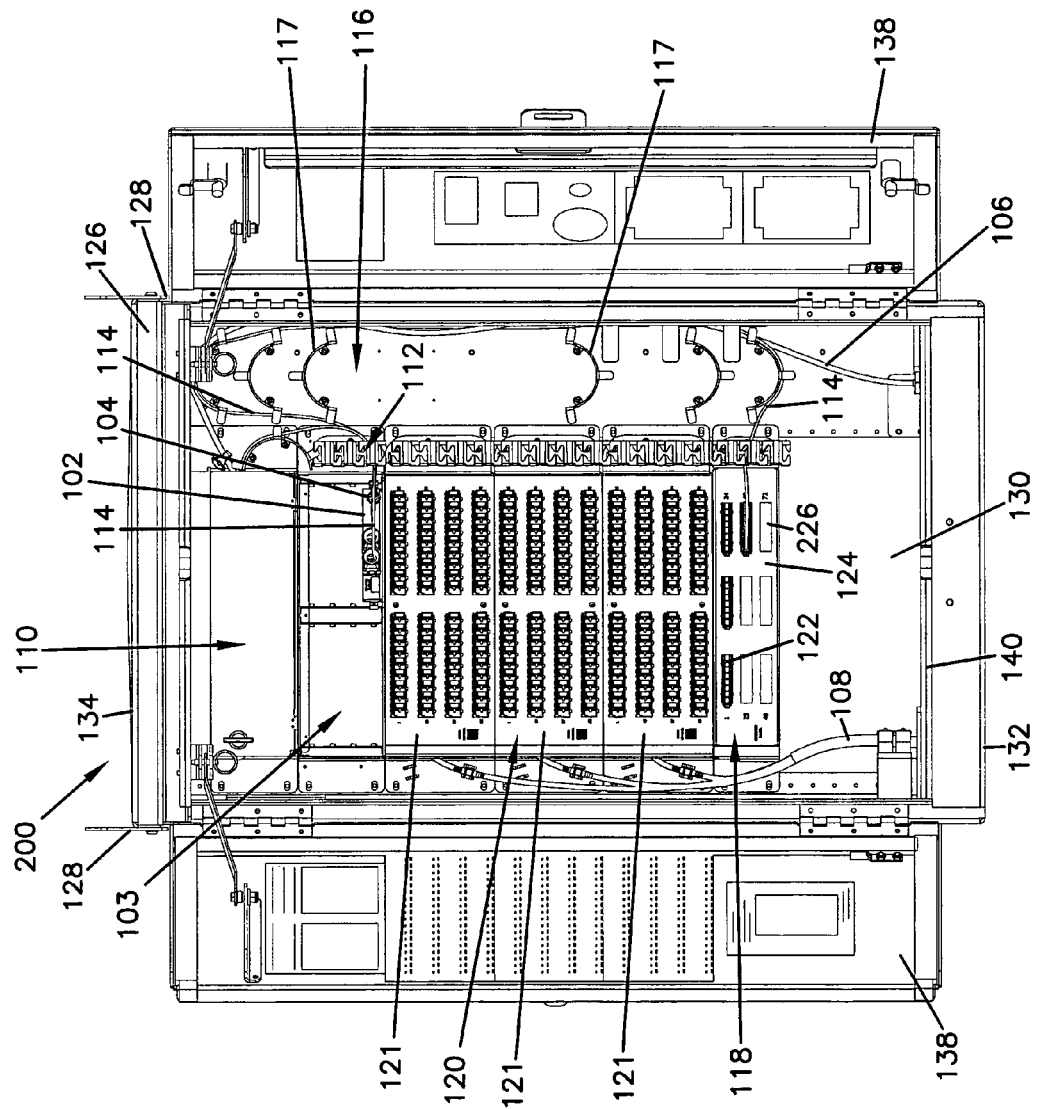
FIG. 2 is a front view of a second embodiment of a fiber optic telecommunications connection cabinet including a multi-position fiber optic connector holder according to the present invention, with only illustrative cables shown to indicate routing.

Referring now to FIG. 2, an alternative embodiment 200 of a telecommunications connection cabinet includes the same components as cabinet 100. Some of the components are altered in appearance or location but the functional characteristics are similar to cabinet 100. Cabinet 100 includes a pair of adapter array panels 121, and each panel 121 includes a total of four rows of eighteen adapters 123, or seventy-two adapters 123. Cabinet 200 includes three such adapter array panels, totaling two hundred sixteen adapters 123. Both cabinets 100 and 200 include a single bulkhead 124 within excess cable storage area 118. Each bulkhead 124 includes openings for mounting three rows of three connector holders 122. Each connector holder 122 includes a total of eight openings for receiving, storing and protecting eight cable connectors of cables 114, providing total storage for up to seventy-two connectors.

Figure 3:
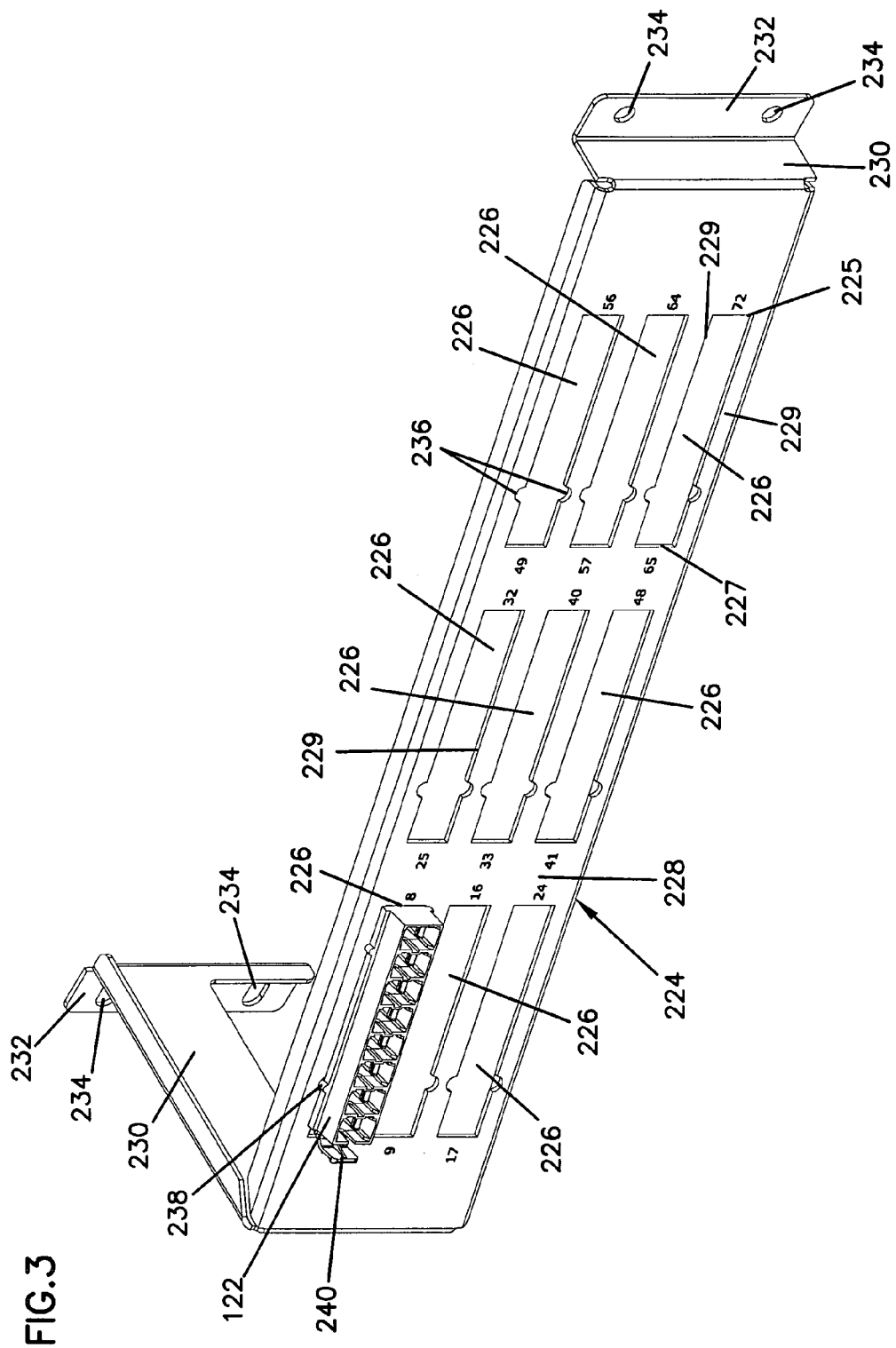
FIG. 3 is a front perspective view of a mounting bulkhead for receiving a multi-position fiber optic connector holder as shown in FIGS. 1 and 2, with a multi-position fiber optic connector holder inserted within one of a plurality of mounting openings.

Referring now to FIG. 3, a bulkhead 224 is shown with nine openings 226 in a front face 228 including a rear surface 229, and one connector holder 122 positioned within one of the openings 226. A pair of opposing sidewalls 230 extend rearward from opposite ends of front face 228 to a pair of mounting flanges 232. Mounting flanges 232 include fastener openings 234 for mounting bulkhead 224 to one of a cabinet 100 or 200, or a similarly configured cabinet. Bulkhead 224 is similar to bulkhead 124 in FIGS. 1 and 2, except configured so that front face 228 would be angled toward one side of the cabinet within which it is mounted. Angling of bulkheads including devices for receiving fiber optic connectors is known in the industry and provides for improved cable management and density of installation while aiding in bend radius protection, among other advantages. As shown in FIGS. 1 and 2, above, bulkhead 124 has equal length sidewalls 230 so that bulkhead 124 is not angled toward either side of cabinet 100 or 200.

Each opening 226 includes a first or top end 227 and a second or bottom end 225. A pair of ears 236 are positioned one each in a pair of opposing sides extending from top end 227 to bottom end 225, the ears 226 cooperating with a keying feature 238 on connector holder 122 to orient connector holder 122 within opening 226. Connector holder 122 includes a releasable latch 240 at one end and a tab 242 on the opposite end (shown in FIGS. 4 to 6, below) which cooperate to releasably hold connector holder 122 within opening 226. It is desirable that the direction of force that may be applied to connector holder 122 by tension in cables 114 be controlled to prevent accidental release of connector holder 122 from opening 226. Keying features 238 and ears 236 cooperate to ensure that connector holder 122 is properly oriented within opening 226 to resist accidental release caused by such cable tension.

Openings 226 within front face 228 of bulkhead 224 (and bulkhead 124) are sized to also receive up to eight adapters 123 when connector holders 122 are not in position. This allows bulkheads 124 and 224 to provide additional space for optically connecting cables 114 with customer equipment cables 108 for added connection capacity with cabinets 100 and 200, as well as similarly configured cabinets.

Referring now to FIGS. 4 to 13, connector holder 122 includes a housing 160 with eight openings 150 for receiving and releasably holding connectors of cables 114. As described above, cables 114 are terminated by an SC style connector and openings 150 are configured to receive and releasably hold an SC connector. As shown in FIGS. 4 to 6, openings 150 extend through housing 160 from a front 162 to a rear 164 and can each receive a connector of a cable 114 with a dust cap about the polished end face of the optical fiber held by cable 114 and the connector. Such a dust cap is shown in the above-referenced and incorporated U.S. Patent Applications. Alternatively, openings 150 might be close-ended so that the polished end face of the connector can be protected from contamination with or without a dust cap.

Housing 160 includes a first end or top 152 and a second end or bottom 154. Releasable latch 240 is mounted to top 152 and tab 242 is in bottom 154. Extending between top 152 and bottom 154 along sides 166 of housing 160 are rails 156. Keying feature 238 is positioned along rail 156 and extends beyond a rear face 158 of rail 156. A portion of housing 160 extending beyond rear face 158 of rail 156 is sized to fit within opening 226. When inserted within opening 226, rear face 158 of rail 156 engages front face 228 and keying feature 238 engages one of the ears 236 to properly orient top 152 and bottom 154 of housing 160.

To insert housing 160 within opening 226, bottom 154 is first positioned within opening 226 through front face 228 so that a locking face 243 of tab 242 is behind front face 228 at bottom end 225 and engages rear surface 229 of front face 228. Top 152 is then inserted within opening 226. A ramped face 244 of releasable latch 240 engages top end 227 of opening 226 and deflects to permit ramped face 244 and locking face 241 of releasable latch 240 to pass through opening 226. Locking face 241 of releasable latch 240 engages rear surface 229. Opposing both locking faces 241 and 243 are rear faces 158 of rails 156, which are engaging front face 228. Both keying features 238 engage ears 236 of opening 226. Releasable latch 240 includes a finger tab 246 which may be depressed to retract locking face 241 so that locking face 241 disengages from rear surface 229 and permits removal of housing 160 from opening 226. Housing 160 is configured to be inserted through front face 228 of bulkheads 124 or 224 when cabinet 100 or 200 is access through opening 140 in front 126.

Referring now to FIGS. 7 to 13, housing 160 of connector holder 122 includes an orientation slot 170 and latching arms 168 within each opening 150. Latching arms 168 cooperate with latching features of an SC style adapter to allow such connectors to be releasably held within openings 150. For other styles and types of connectors, different latching features might be included within opening 150 to permit these connectors to be releasably held. Orientation slot 170 may cooperate with an orientation feature on the exterior of an SC connector to orient all connectors within openings 150 in the same fashion. Such orientation of connectors is not essential for SC connectors, which have generally symmetrical latching features, but may be desirable for other connectors with different latching configurations.

Figure 14:
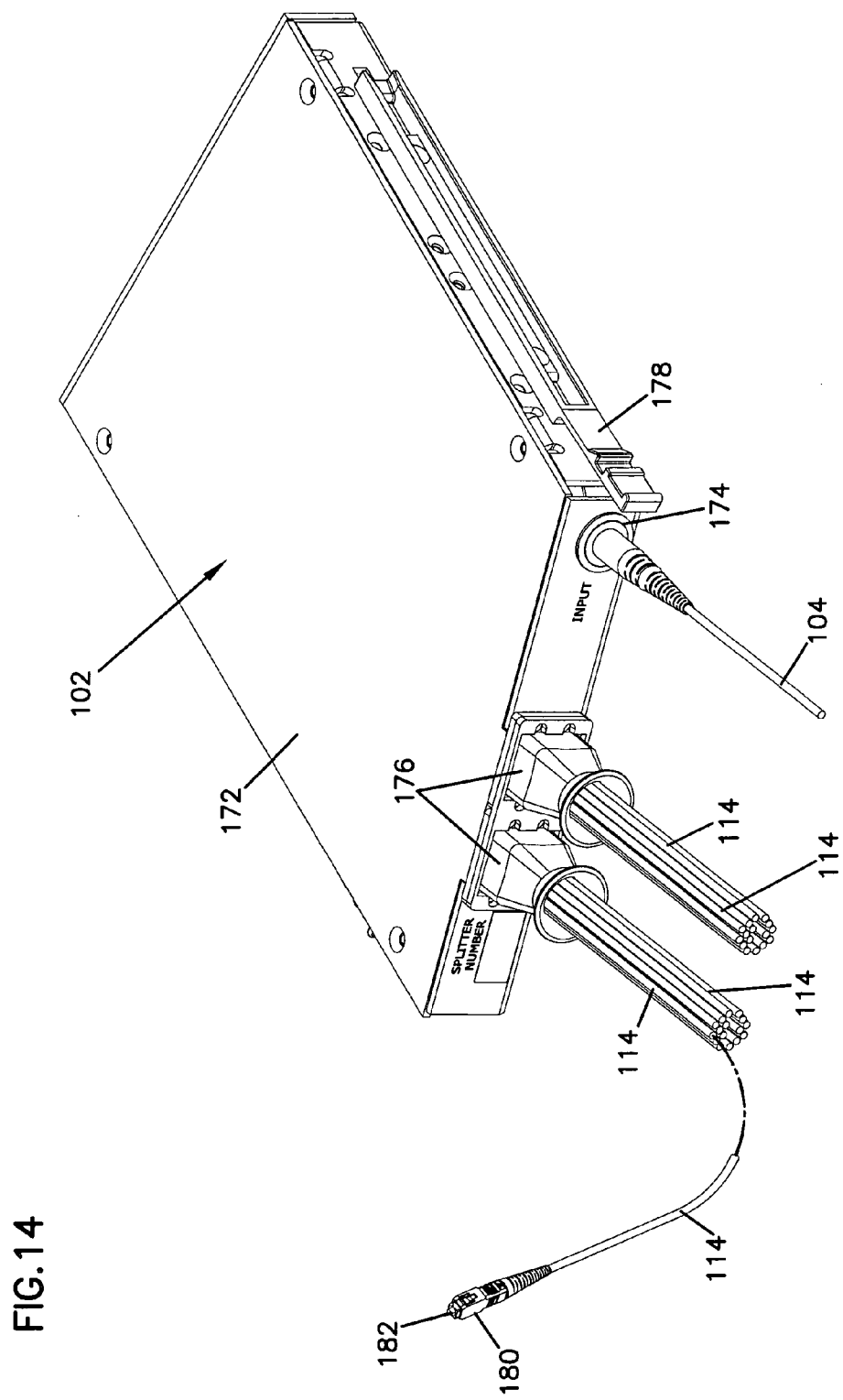
FIG. 14 is a front perspective view of a fiber optic splitter module as shown within the cabinets of FIGS. 1 and 2.

Referring now to FIG. 14, splitter 102 includes a housing 172 with a cable entry 174 for secondary cable 104 and a pair of cable exits 176 for cables 114. As shown, each cable exit 176 allows for up to sixteen cables 114 to exit housing 172. Terminating each cable 114 is a connector 180 with a polished end face 182, shown as an SC connector. Other sizes and layouts of cable exits are anticipated. Different numbers of cables 114 may exit housing 172, depending on the connection requirements to be satisfied and the optical splitter arrangement within splitter 102. Mounted to one side of housing 172 is a releasable latch 178 to hold splitter 102 within splitter mounting area 103 of cabinet 100 or 200, or similarly configured telecommunications connection cabinets.

Figure 14A:
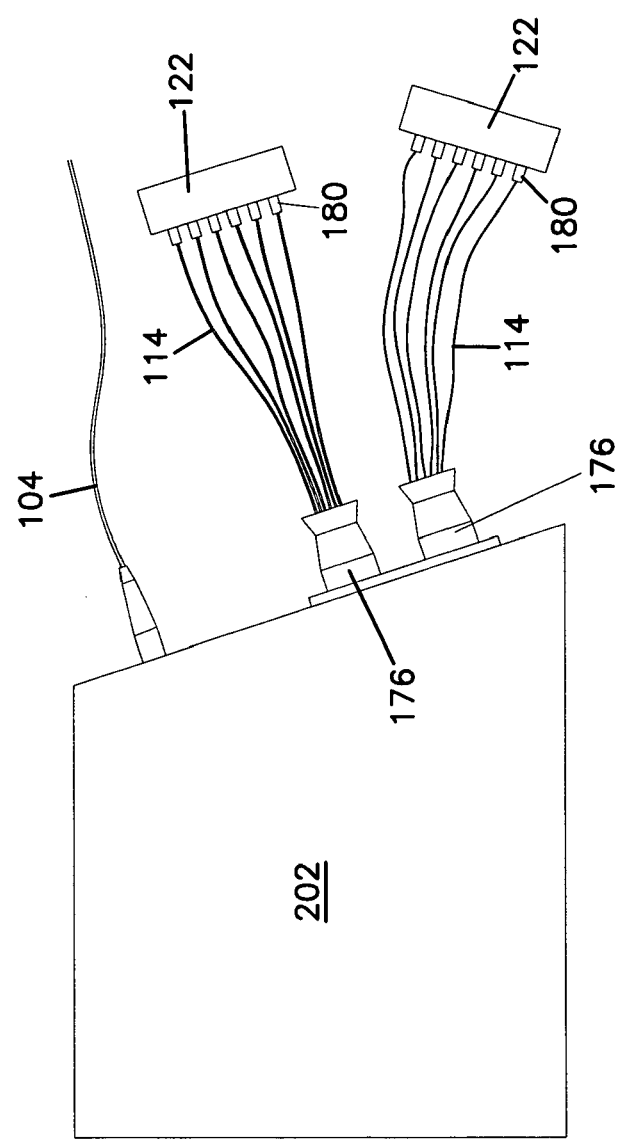
FIG. 14A is a top view of a fiber optic device according to the present invention.

FIG. 14A shows a fiber optic device module 202 similar in layout to splitter 102 with secondary cable 104 and a plurality of cables 114. Secondary cable 104 may be a single strand cable and module 202 may include a splitter to connector cable 104 with cables 114, such as described above with regard to module 102. Alternatively, cable 104 may be a multi-strand cable and module 202 may serve only as a fan-out module separating the strands into cables 114. Each of the cables 114 are terminated by a connector 180 and each connector 180 is inserted within a connector holder 122. Such a module 202 may be used in the method of adding connection capacity described below.

A method of adding connection capacity to cabinet 100 might include installing a preconfigured splitter 102 in combination with one or more connector holders 122. It is desirable to provide for easy field expansion of connection capacity within cabinet 100 so that cabinet 100 does need to anticipate the ultimate connection configuration for a particular customer service area when installed. Cabinet 100 may be installed with only enough connection capacity to serve the immediate need forecasted for a customer area and allow for incremental expansion as more connections are needed in the area. The following method of adding connection capacity to cabinet 100 is also applicable to cabinet 200 and may be used to initially configure cabinet 100 prior to installation or to expand the capacity of cabinet 100 in the field.

To increase connection capacity within cabinet 100, a splitter 102 preconfigured with a cable 104 and thirty-two cables 114 terminated by connectors 180 is used. The splitter 102 is mounted within splitter mounting area 103 and the free end of cable 104 is led into cable management structure 112 and to splice panel 110. In splice panel 110, the free end of cable 104 is spliced into an end of an OSP cable 106. This splice optically connects OSP cable 106 to each of the cables 114. Connectors 180 of cables 114 are pre-inserted within four connector holders 122. Cables 114 are led from splitter 102 through cable management structure 112 to second cable management structure 116 where excess cable length may be retained within the cable slack storage arrangement. Since splitter 102 may be preconfigured for use with different cabinets as well as cabinet 100, the length of cables 114 of splitter may be longer than required for cabinet 100 and this excess length may be held about the cable slack storage spools 117 (see FIG. 1).

From second cable management area 116, cables 114 and connector holders 122 with connectors 180 inserted are positioned within excess cable storage area 118. Each connector holder 122 is simply snapped into one of the openings 226 of bulkhead 124. Addition of extra connection capacity is now completed. When a customer connection is required, a customer equipment cable 108 is led into cabinet 100 and terminated with a connector 180. This connector is inserted within a rear opening of an adapter 123 within adapter array 120. Alternatively, when cabinet 100 is installed, the rear of all adapters 123 in adapter array 120 may have customer equipment cables 108 prewired and these cables led to the customer premises in anticipation of future customer hookups. When such a prewired customer desires a live connection, a cable 114 merely needs to be inserted into the front of the appropriate adapter 123. One of the cables 114 within excess cable storage area 118 is selected and its connector 180 is removed from connector holder 118. The selected cable 114 is re-routed within second cable management area 116 as needed to provide a desired length of cable and the connector 180 is inserted within the appropriate adapter 123 in adapter array 120. If connector 180 of the selected cable 114 includes a dust cap to protect the polished end face of the fiber, this dust cap is removed prior to insertion into the adapter 123.

Splitter 102 includes thirty-two cables 114 and connectors 180, inserted within four connector holders 122 when splitter 102 is installed. As these cables 114 and connectors 180 are transferred into adapter array 120, some or all of the connector holders 122 may be emptied of all connectors 180. When this happens, the empty connector holder 122 may be removed from excess cable storage area 118 and discarded or recycled. Removal of these empty connector holders 122 would free openings 226 in bulkhead 124 to permit connector holders of additional splitters 102 to be installed and more capacity to be added to cabinet 100.

If a connection to customer equipment needs to be terminated, the connector 180 of the appropriate cable 114 may be removed from the adapter 123. The cable 114 is then rerouted within the cable management structure 116 and the connector 180 inserted within an opening 150 of a connector holder 122 within excess cable storage area 118.

Splitter mounting area 103 of cabinet 100 includes spaces to mount up to four splitters 102, while cabinet 200 provides spaces to mount up to eight splitters 102. Thus configured, cabinet 100 has a capacity to connect up to split up to four OSP cables into thirty-two cables 114 each, or up to a total of one hundred twenty eight cables 114. Within adapter array 120 there are a sufficient number of adapters 123 to permit connection of each of these cables 114 to a corresponding customer equipment cable 108.

However, cabinet 200 has the capacity to split up to eight OSP cables into thirty-two cables 114 each, or up to a total of two hundred fifty-six cables 114. Adapter array 120 in cabinet 200 only provides a total of two hundred sixteen adapters 123 for receiving connectors from cables 114. Once adapter array 120 has been fully populated with cables 114, there may be up to forty excess cables 114 within excess cable storage area 118 which are not provided with an adapter 123 for connection with a customer equipment cable 108.

As shown in FIGS. 4 to 13, housing 160 of connector holder 122 with eight openings 150 has generally the same footprint as an array of eight adapters 123. When adapter array 120 has been fully populated with cables 114 from splitters 102, connector holders 122 may be removed from openings 226 in bulkhead 124 and up to eight adapters 123 may be positioned in each opening 226. By fully filling five of the openings in bulkhead 124 with adapters 123, an additional forty cables 114 can be connected with customer equipment cables 108, effectively increasing the capacity of adapter array 120 so that the forty excess cables 114 may be utilized. Even with five of the openings 226 in used by adapters 123, there are still openings 226 remaining for connector holders 122 so that cables 114 can be stored when connections with customer equipment cables are eliminated or changed.

Figure 15:
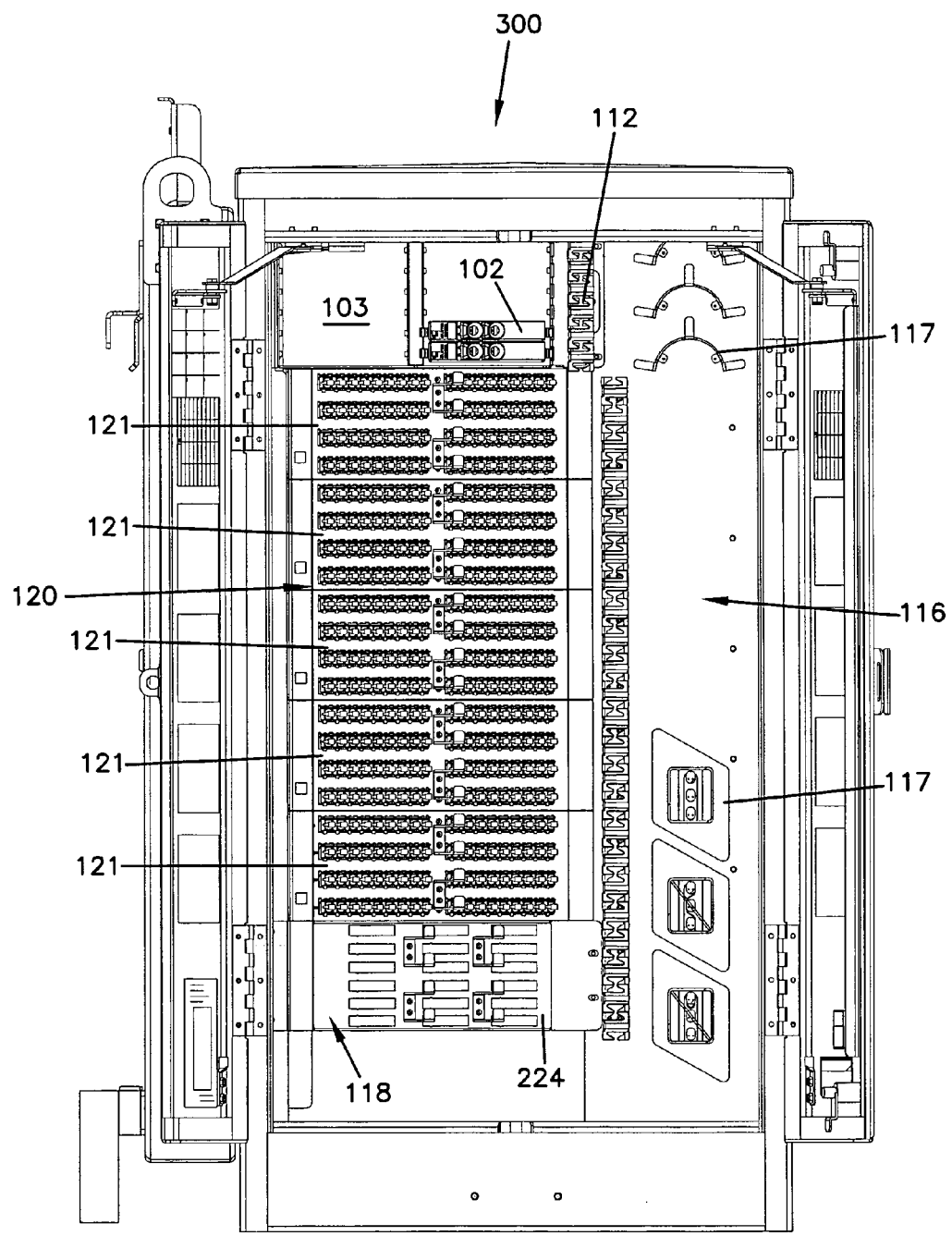
FIG. 15 is a front view of a third embodiment of a telecommunications connection cabinet according to the present invention.

FIG. 15 shows a third alternative embodiment of a telecommunications connection cabinet 300, similar in configuration to cabinets 100 and 200, but including bulkhead 224 in excess cable storage area 118. Adapter panels 121 and bulkhead 224 are angled toward cable management structure and slack storage 116 to improve transfer of cables 114 from cable management structure 116 to adapters 123 and to connector holders 122. In addition, cables supports 302 are provided on both panels 121 and bulkhead 224 to provide support to cables 114 extending to adapters 123 and connector holders 122, respectively.

Figure 16:
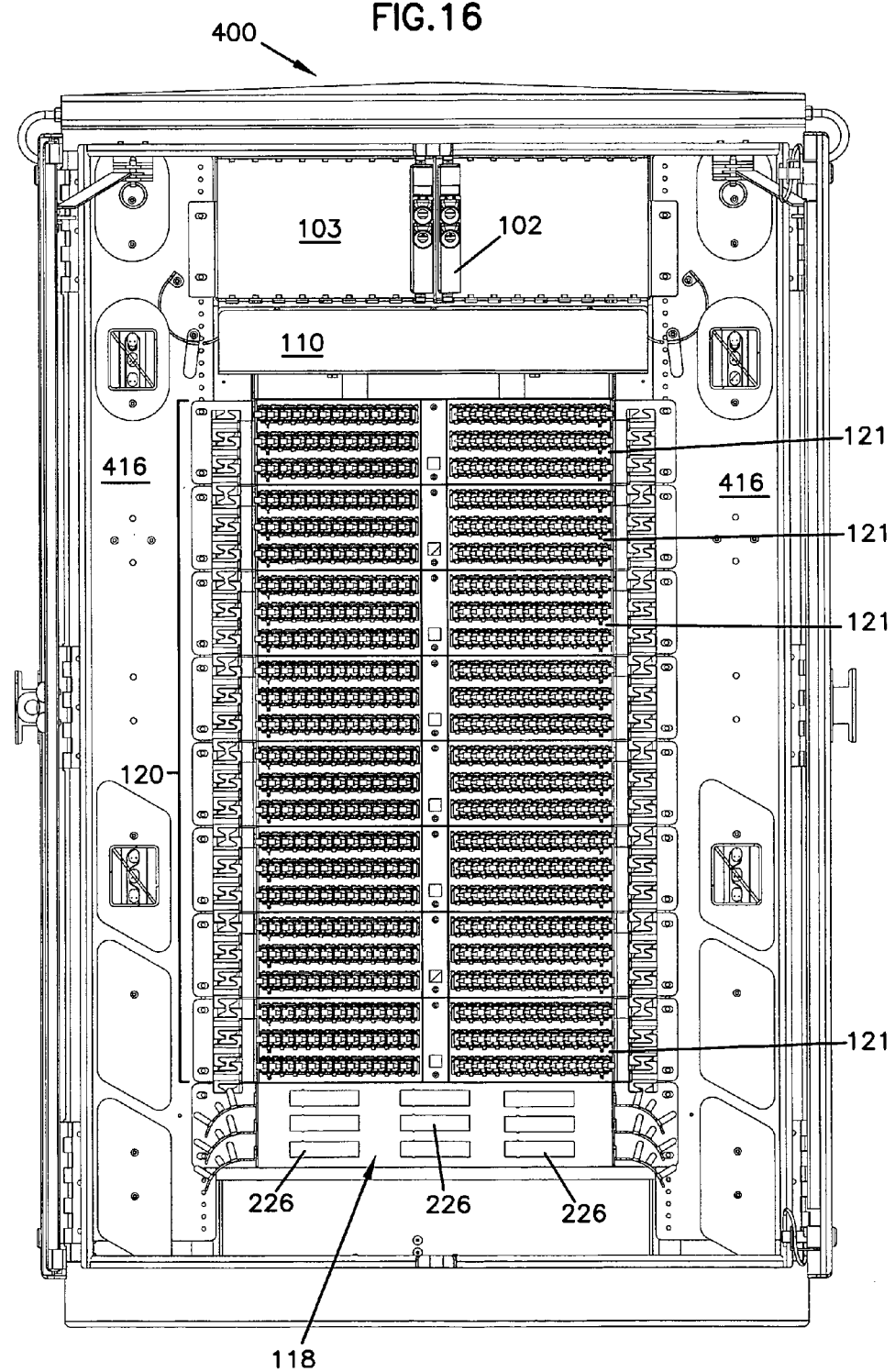
FIG. 16 is a front view of a fourth embodiment of a telecommunications cabinet according to the present invention.

FIG. 16 illustrates a fourth embodiment of a telecommunications connection cabinet 400 according to the present invention. Cabinet 400 is similar in configuration to the previously described cabinets 100, 200 and 300, with a cable a cable management structure 416 with cable slack storage along both sides of adapter array 120 and excess cable storage area 118. Adapters 123 adjacent the left side of panels 121 are angled toward the left side of cabinet 400 and adapters 123 adjacent the right side of panels 121 are angled toward the right side of the cabinet.

Figure 17:
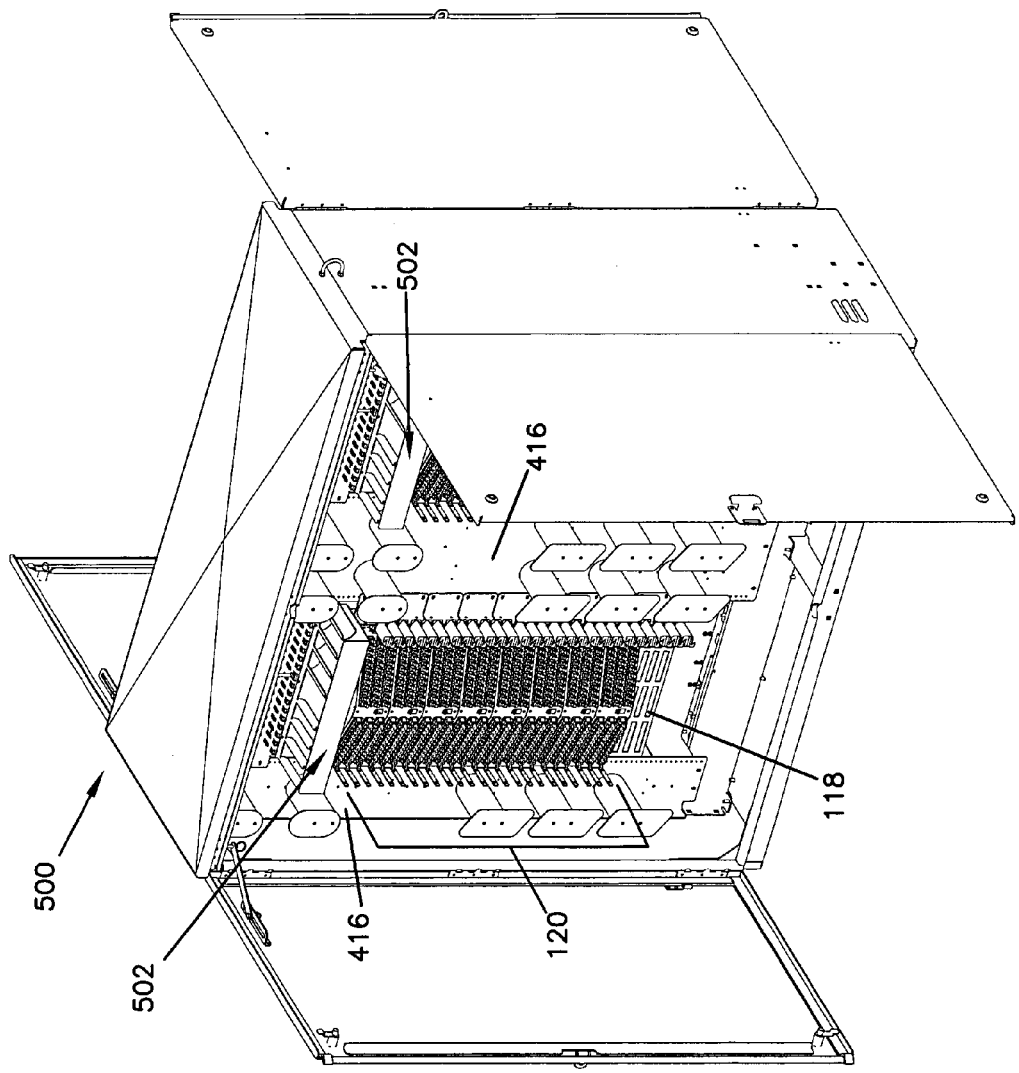
FIG. 17 is a front perspective view of fifth embodiment of a telecommunications connection cabinet according to the present invention.

FIG. 17 is a fifth embodiment of a telecommunications cabinet 500 including side-by-side structure 502 within the cabinet. Each structure 502 is similar in configuration to the contents of cabinet 400.

Figure 18:
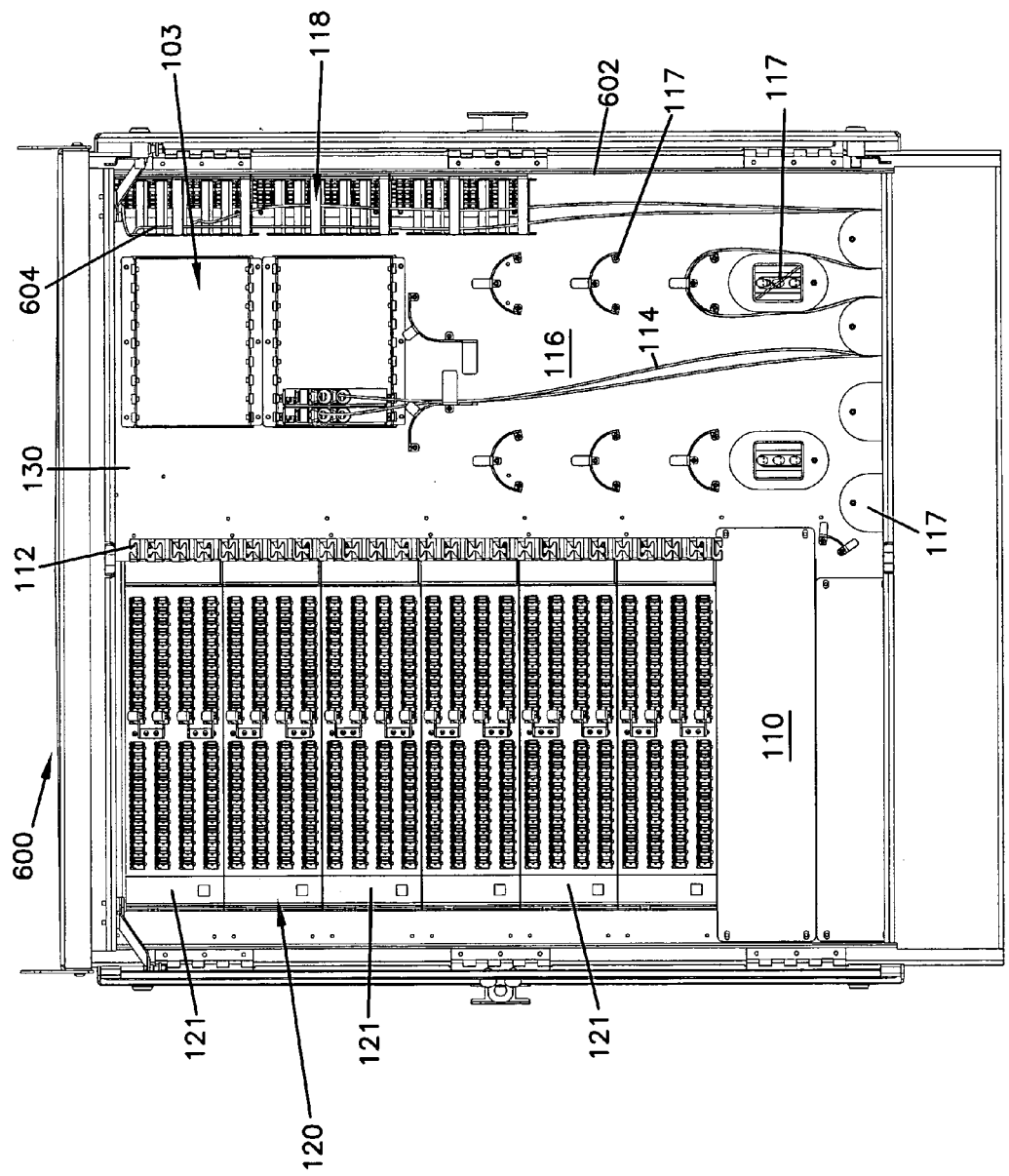
FIG. 18 is a front view of a sixth embodiment of a telecommunications cabinet according to the present invention, with the excess fiber storage area mounted adjacent an inside surface of a side wall.
Figure 19:
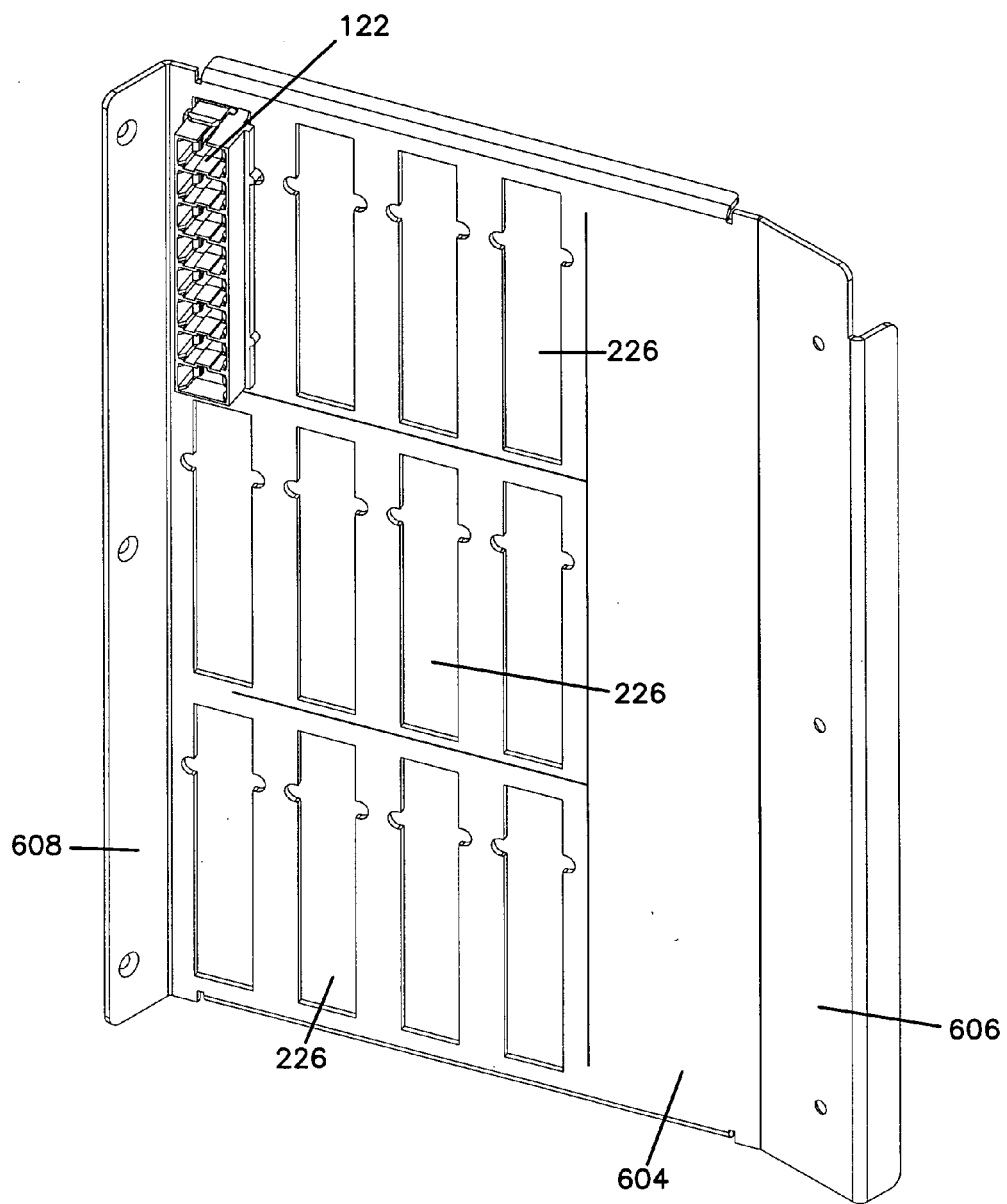
FIG. 19 is a front perspective view of a mounting bulkhead for receiving a multi-position fiber optic connector holder as shown in FIG. 18, with a multi-position fiber optic connector holder inserted within one of a plurality of mounting openings.
Figure 20:
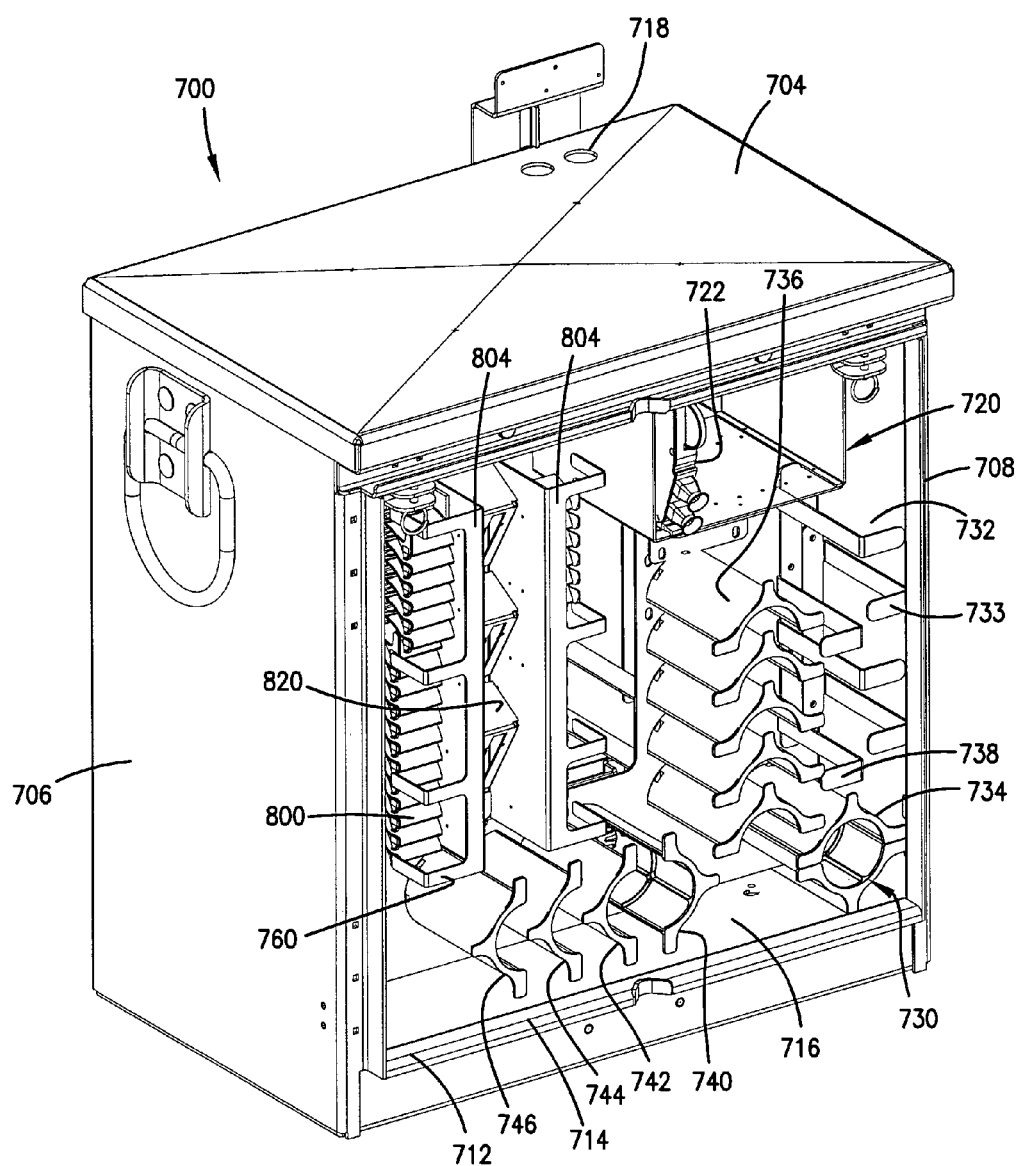
FIG. 20 is a front perspective view of a seventh embodiment of a telecommunications cabinet according to the present invention, with the front doors removed, and with the excess fiber storage area mounted adjacent to an adapter array.
Figure 21:
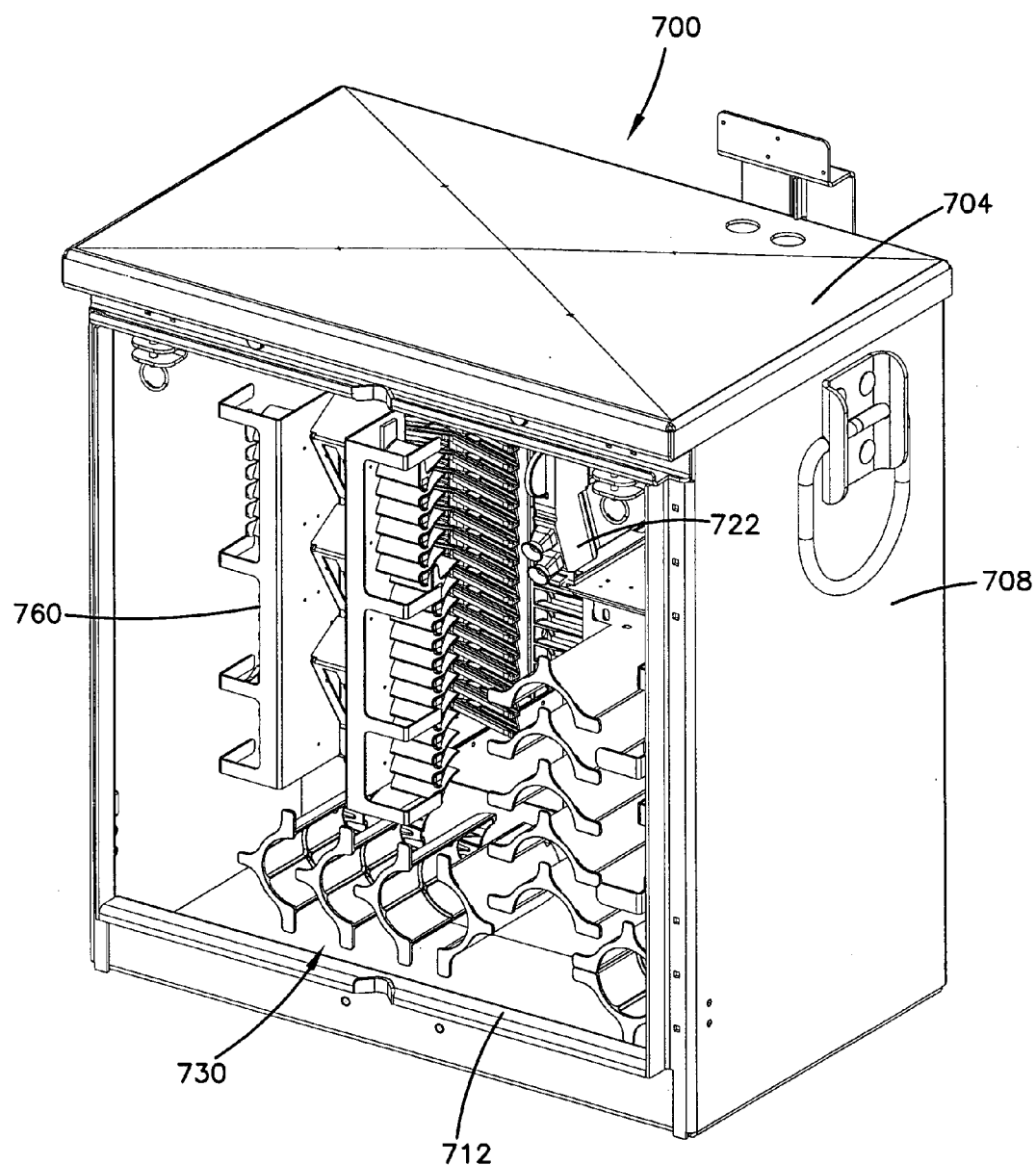
FIG. 21 is a further perspective view of the cabinet shown in FIG. 20.
Figure 22:
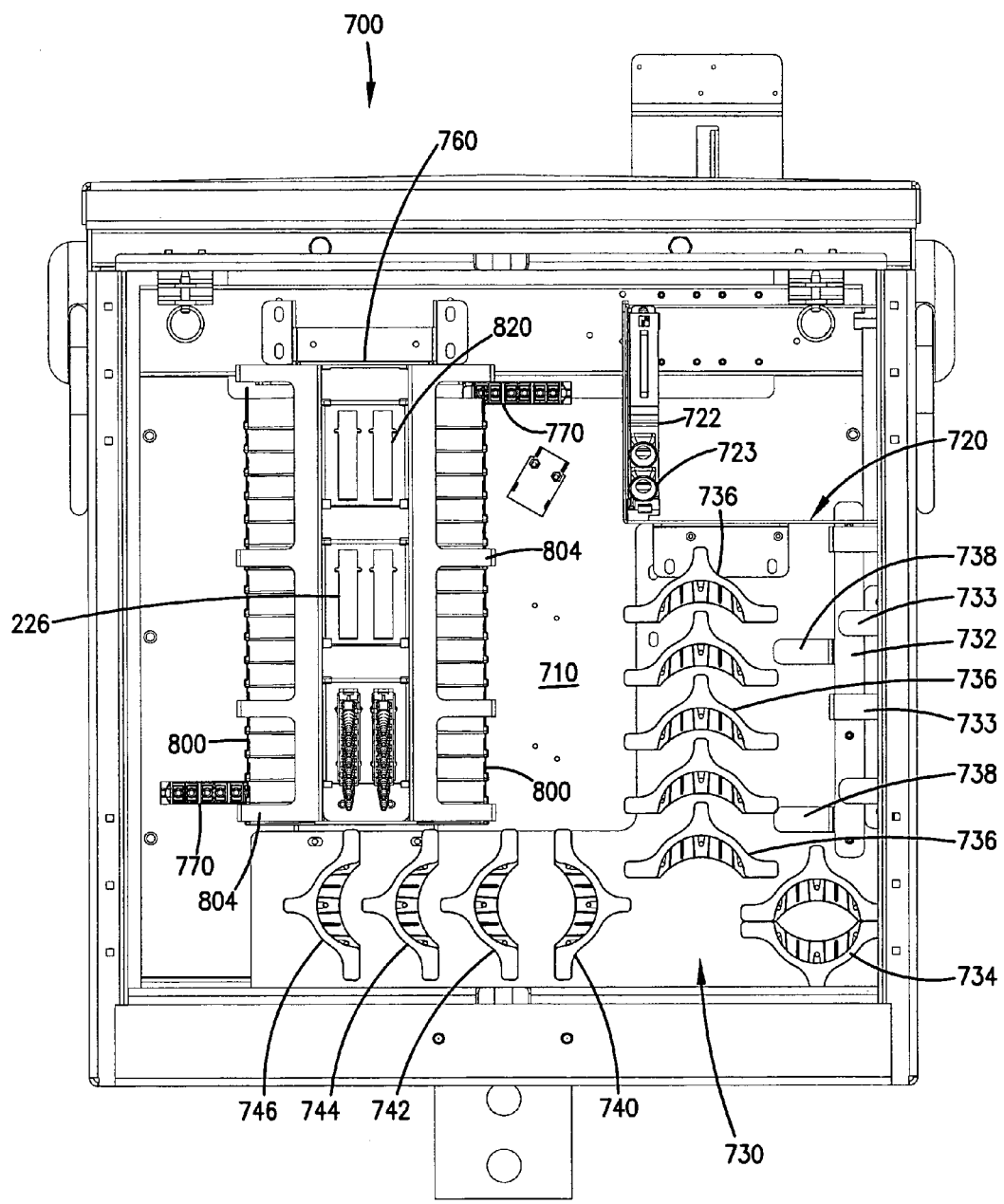
FIG. 22 is a front view of the cabinet shown in FIG. 20 including two adapter modules in the extended positions with connectors, and connectors in the connector storage panel.
Figure 23:
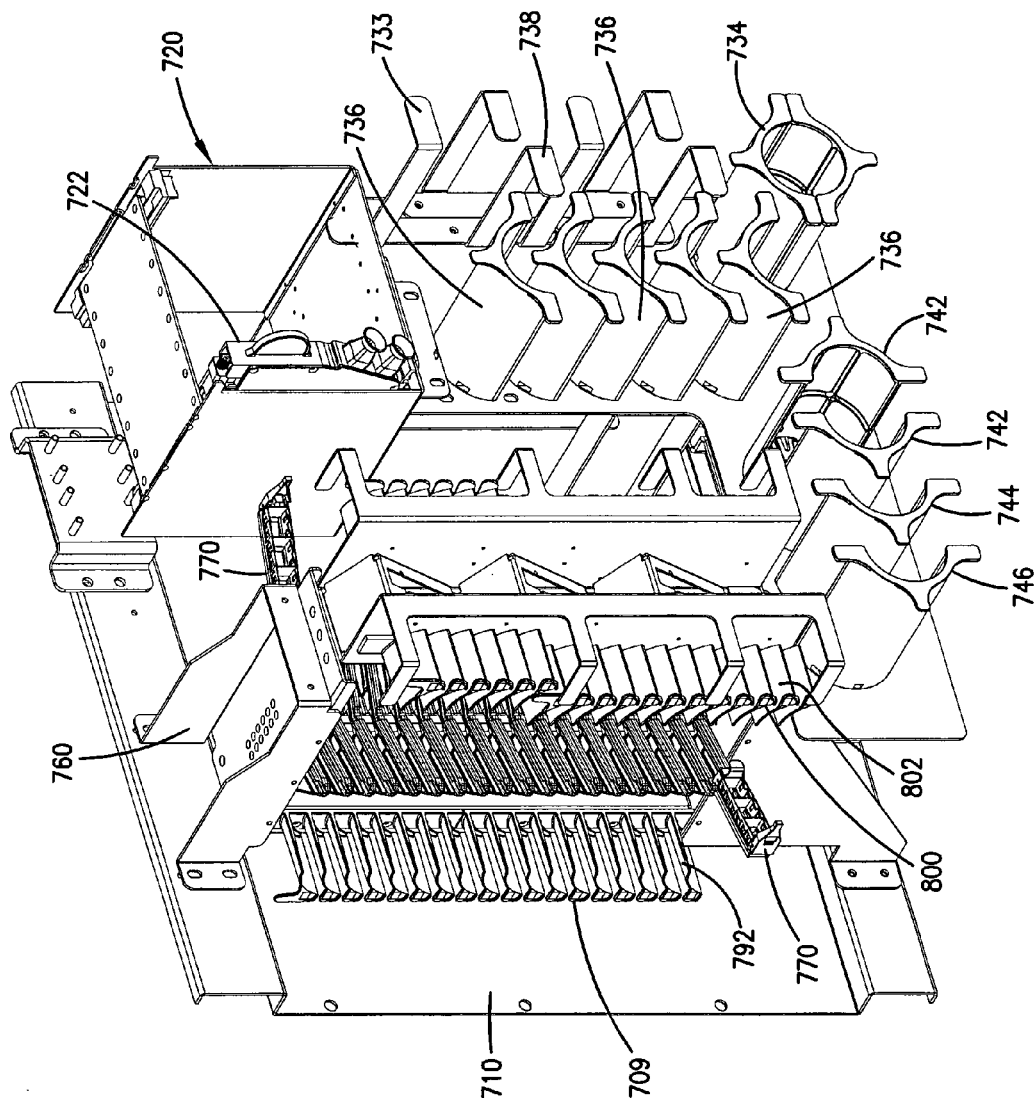
FIG. 23 is a perspective view of interior components of the cabinet of FIGS. 20–22.
Figure 24:
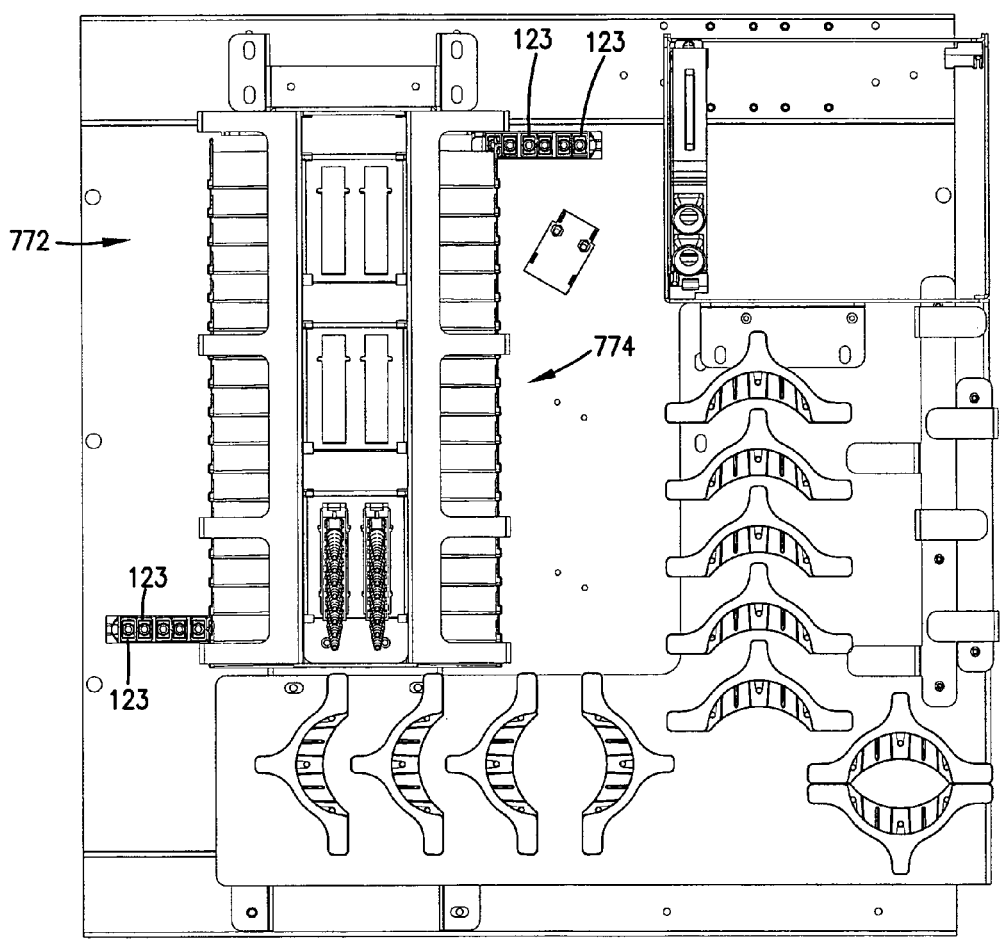
FIG. 24 is a front view of the interior components of FIG. 23, showing connectors connected to adapters of the adapter modules, and connectors in the connector storage panel.
Figure 25:
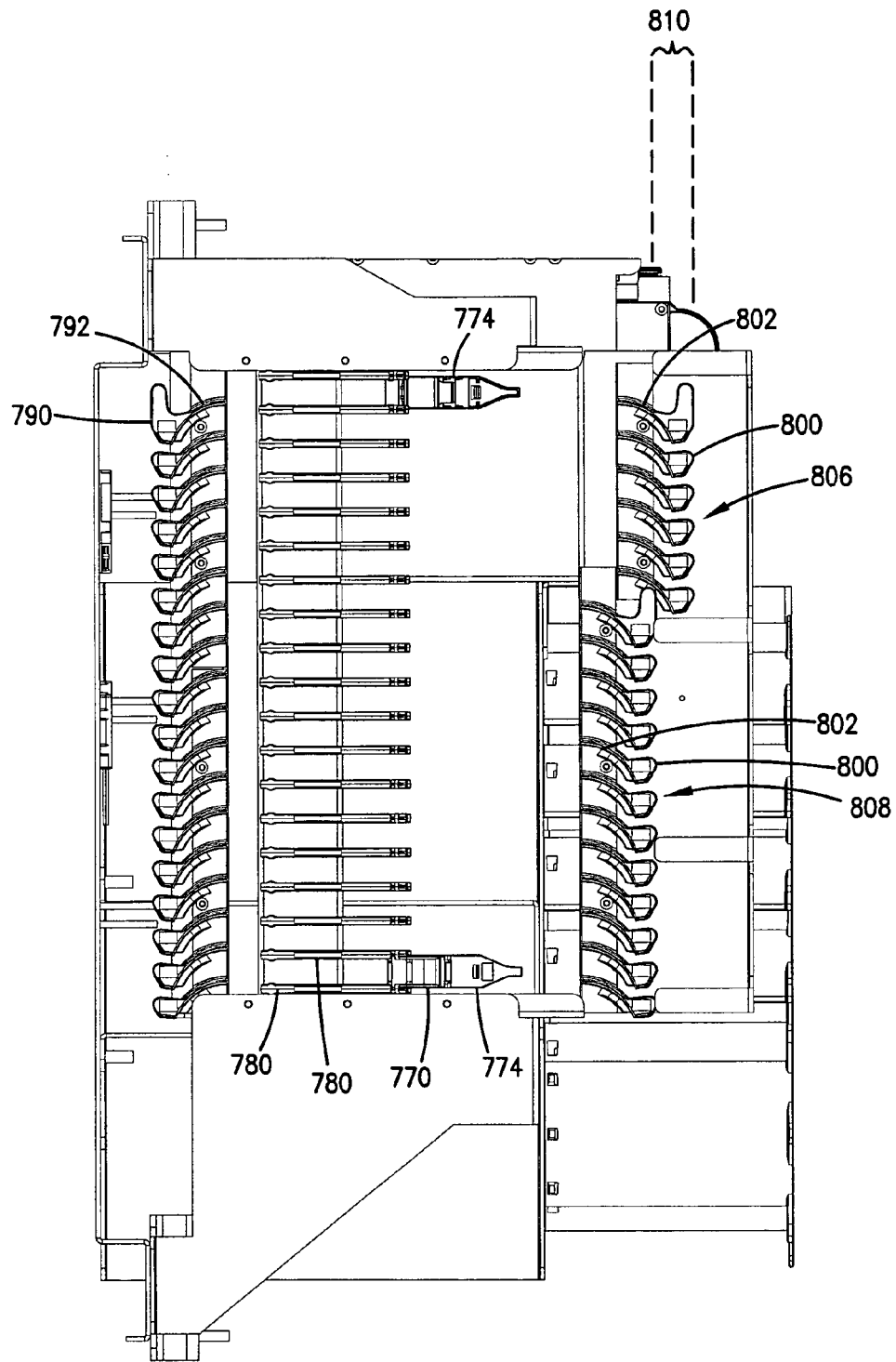
FIG. 25 is a side view of the interior components of FIG. 23.

FIG. 18 is sixth embodiment of a telecommunications cabinet 600 where excess cable storage area 118 is positioned alongside one of an interior wall 602. FIG. 19 shows a bulkhead 604 including a plurality of openings 226 for receiving connector holders 122. The other elements within cabinet 600 are similar to the earlier described cabinets Bulkhead 604 includes a pair of mounting flanges 606 and 608 for connection to the interior 602 and cabinet rear wall 130, respectively.

Referring now to FIGS. 20–36, a seventh embodiment of a telecommunications cabinet 700 is shown. Cabinet 700 is similar in some respects to the earlier described cabinets with regard to connector storage features. Cabinet 700 also has splitters and adapters for connecting between the cables from the splitters and adapters connected to cables leaving cabinet 700 connected to customer equipment.

Cabinet 700 includes a base 702, a top 704 and opposing sides 706, 708. A rear wall 710 is opposite a front 712. Front 712 defines an opening 714 into an interior 716 defined by base 702, top 704, sides 706, 708, and rear wall 710. Cables can enter cabinet 700 through opening 718.

Disposed with interior 716 is a splitter mounting area 720 including one or more splitters 722. Splitters 722 can be constructed in a similar manner as splitters 102 defined above, or as in co-pending application Ser. No. 10/980,978, filed Nov. 3, 2004, entitled "Fiber Optic Module And System Including Rear Connectors", the disclosure of which is hereby incorporated by reference. The splitters of the co-pending application noted above have input cables connected to a rear facing portion of the splitter 722. Splitter 722 outputs cables at ports 723.

Cabinet 700 further includes a cable management area 730 including a vertical cable guide 732 for cables extending from splitters 722. A lower spool 734 allows cables to extend back upwardly toward vertical spools 736. Vertical spools 736 allow for slack storage. Vertical spools 736 form a vertical column of discrete spools selectable by the technician for storing slack. Vertical cable guide 732 includes a plurality of fingers 733 for managing the cables. Similarly, additional fingers 738 manage the cables extending to vertical spools 736. A further cable spool 740 manages cables extending from vertical spools 736 toward horizontal spools 742, 744, 746. Horizontal spools 742, 744, 746 manage cables extending upwardly toward a fixture 760. Horizontal spools 742, 744, 746 are arranged in a row.

Fixture 760 includes a frame 762 with rear brackets 764, 766 for mounting fixture 760 to rear wall 710. Fixture 760 includes a plurality of adapters 123 for connecting front fiber optic connectors 725 to rear fiber optic connectors 727 (See FIGS. 26 and 34–36). Cables extend from splitters 722 to the front connectors 725, and cables extend to the customers' premises to the rear connectors 727 to link the splitters 722 to the customers' premises. Adapters 123 form an adapter array.

Figure 26:
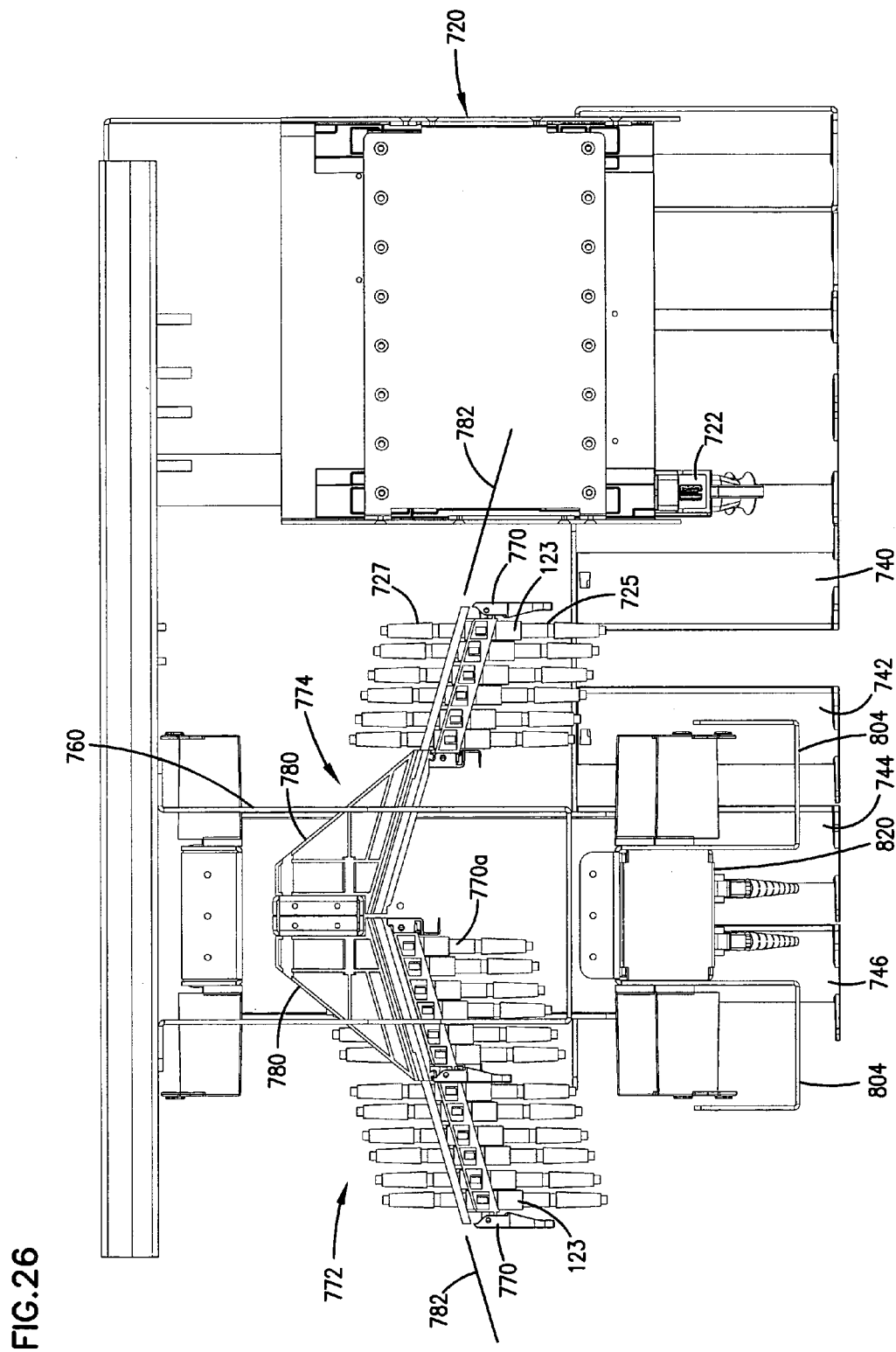
FIG. 26 is a top view of the interior components of FIG. 23, showing connectors connected to the adapters of the adapter modules, and connectors in the connector storage panel.
Figure 27:
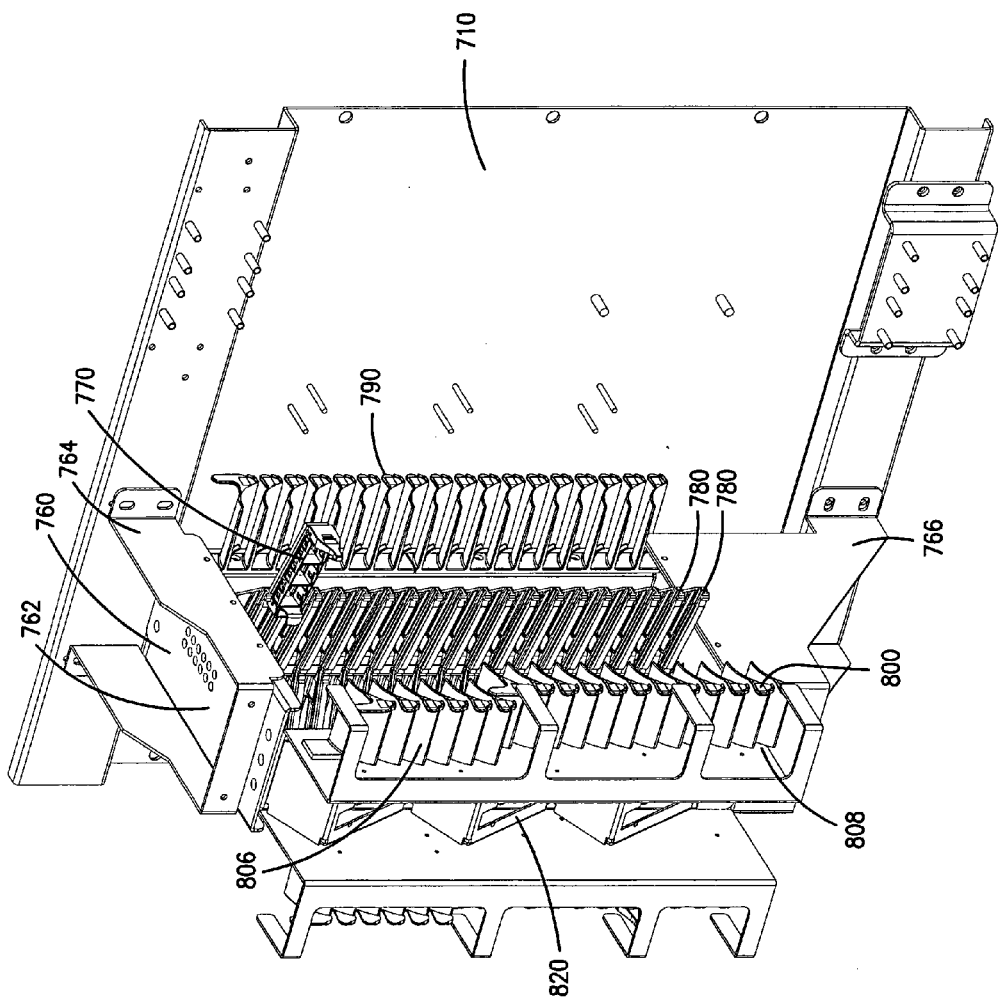
FIG. 27 is a perspective view of the fixture and rear plate of the cabinet of FIGS. 20–22.
Figure 28:
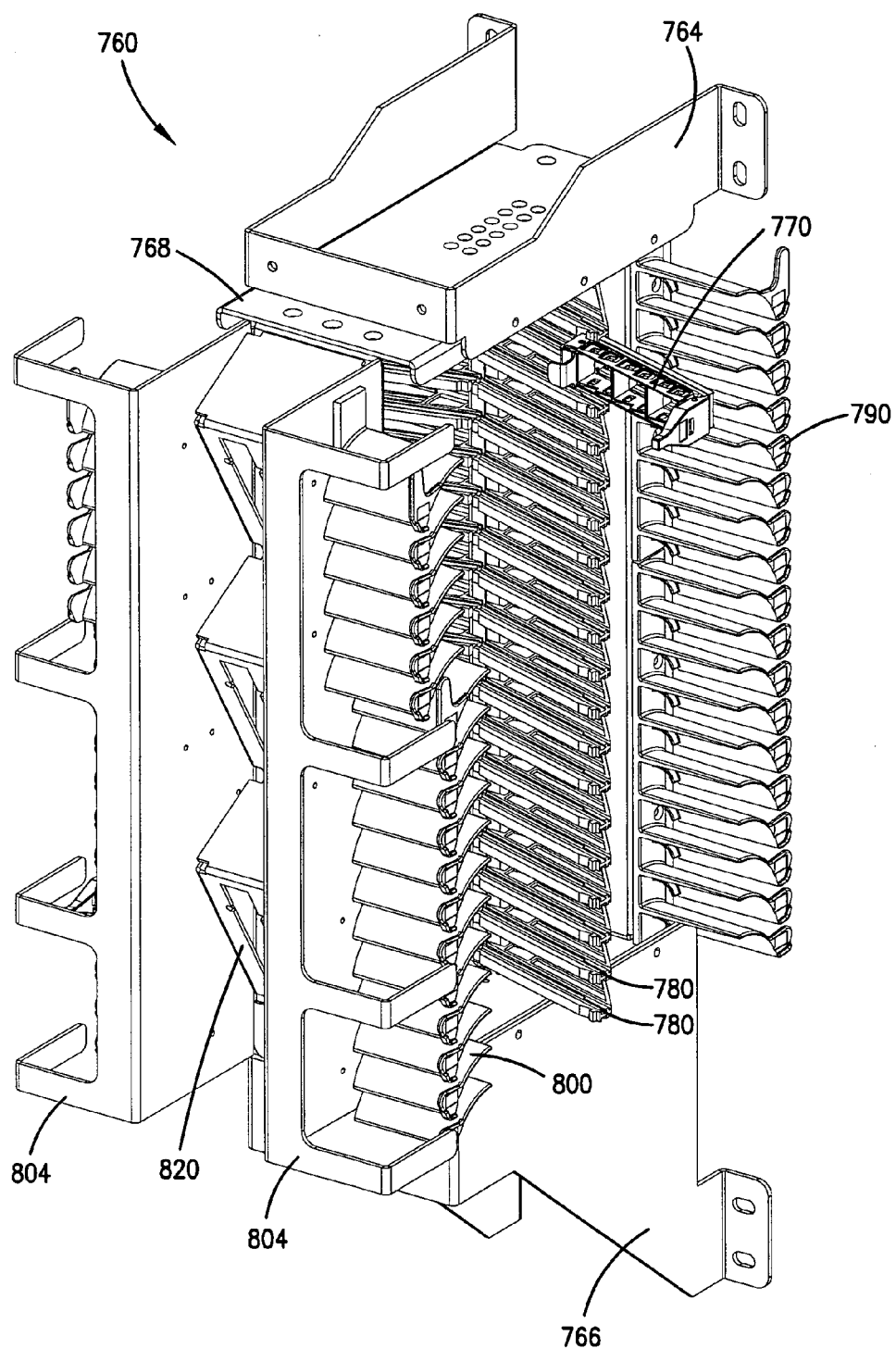
FIG. 28 is a perspective view of the fixture.
Figure 29:
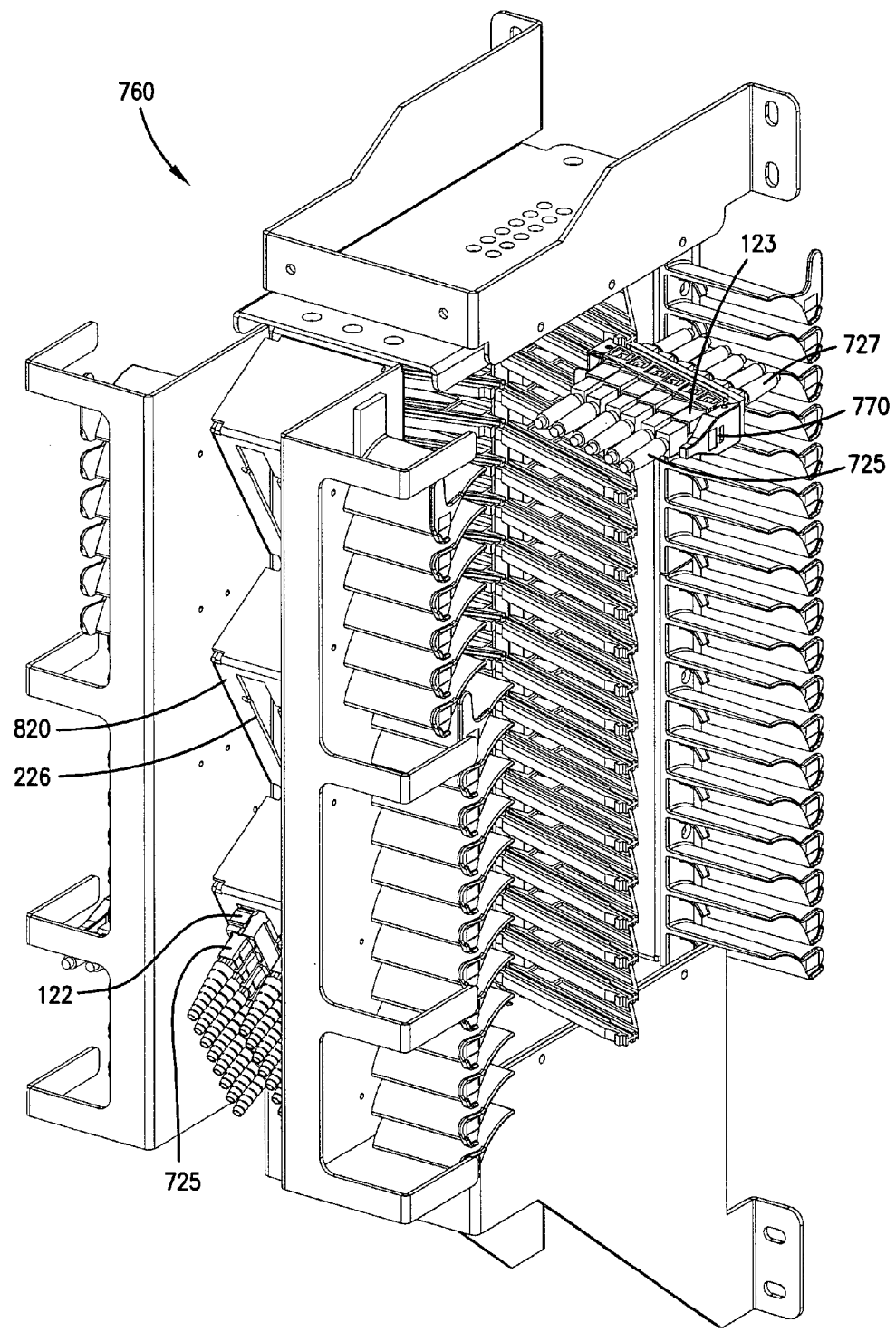
FIG. 29 is a perspective view of the fixture as in FIG. 28, showing connectors connected to the adapter modules, and connectors in the connector storage panel.
Figure 30:
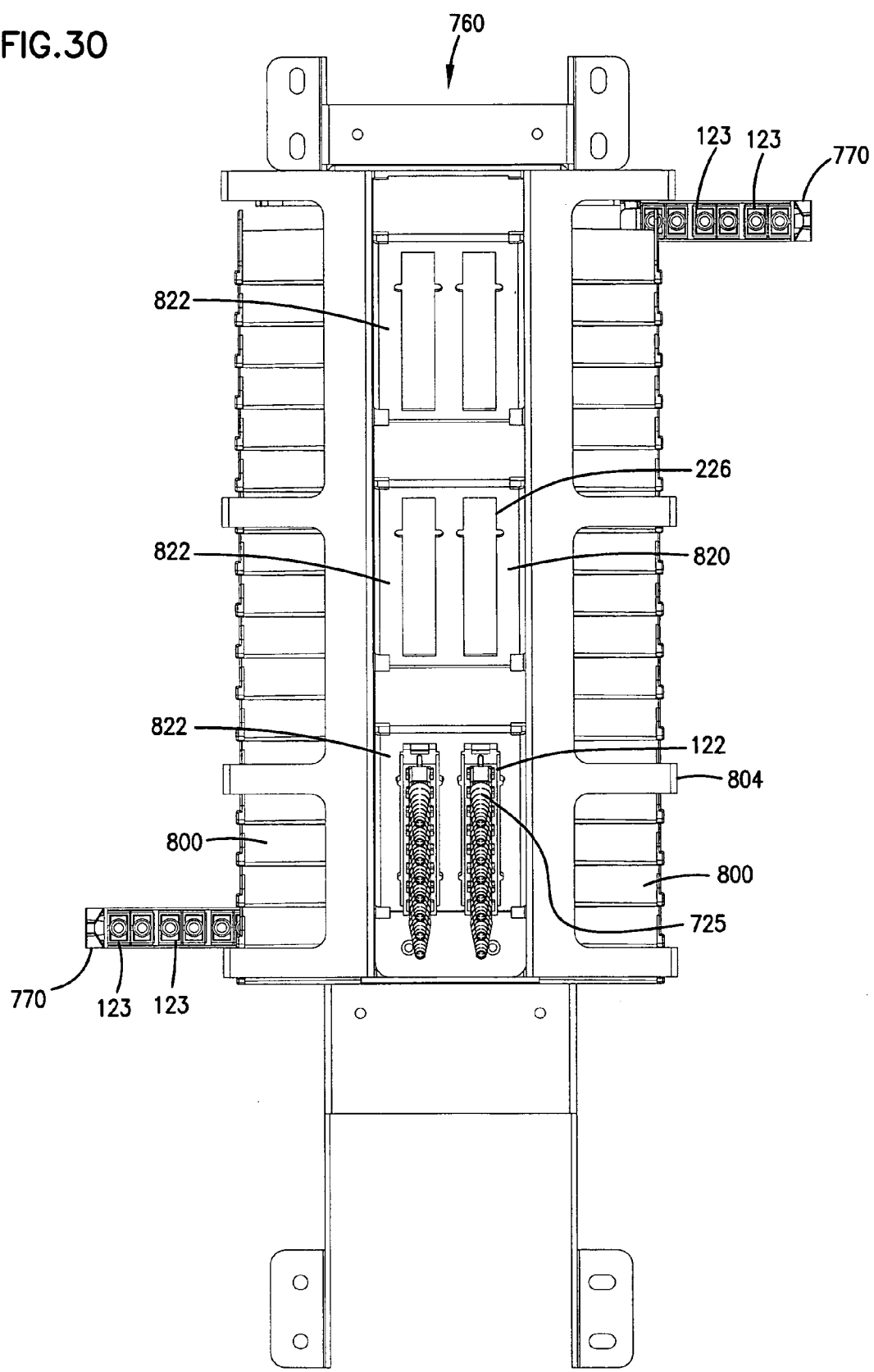
FIG. 30 is a front view of the fixture of FIG. 29.
Figure 31:
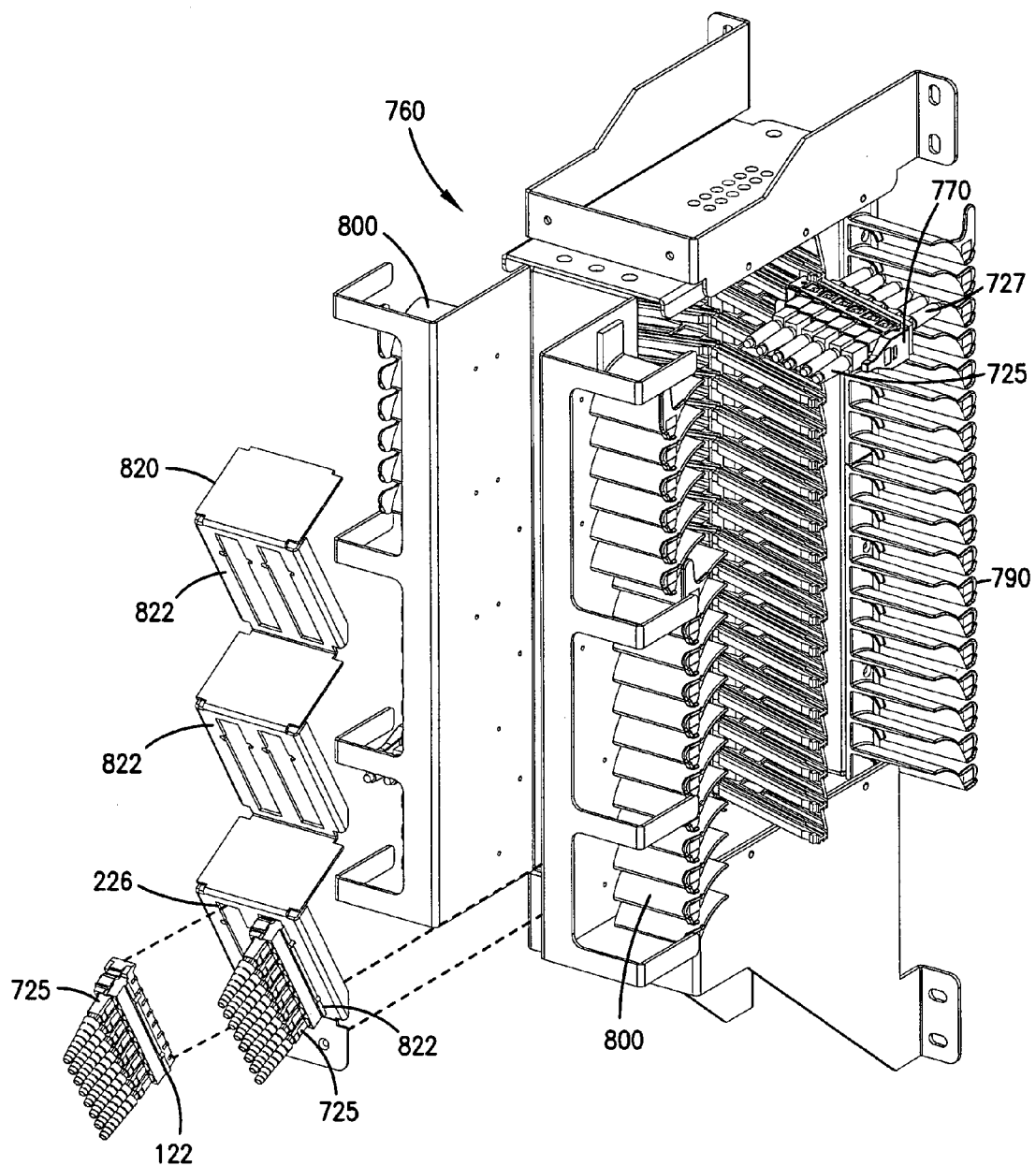
FIG. 31 is a partially exploded view of the fixture of FIG. 29, showing the connector storage panel exploded from the fixture, and showing one of the connector holders exploded from the connector storage panel.
Figure 32:
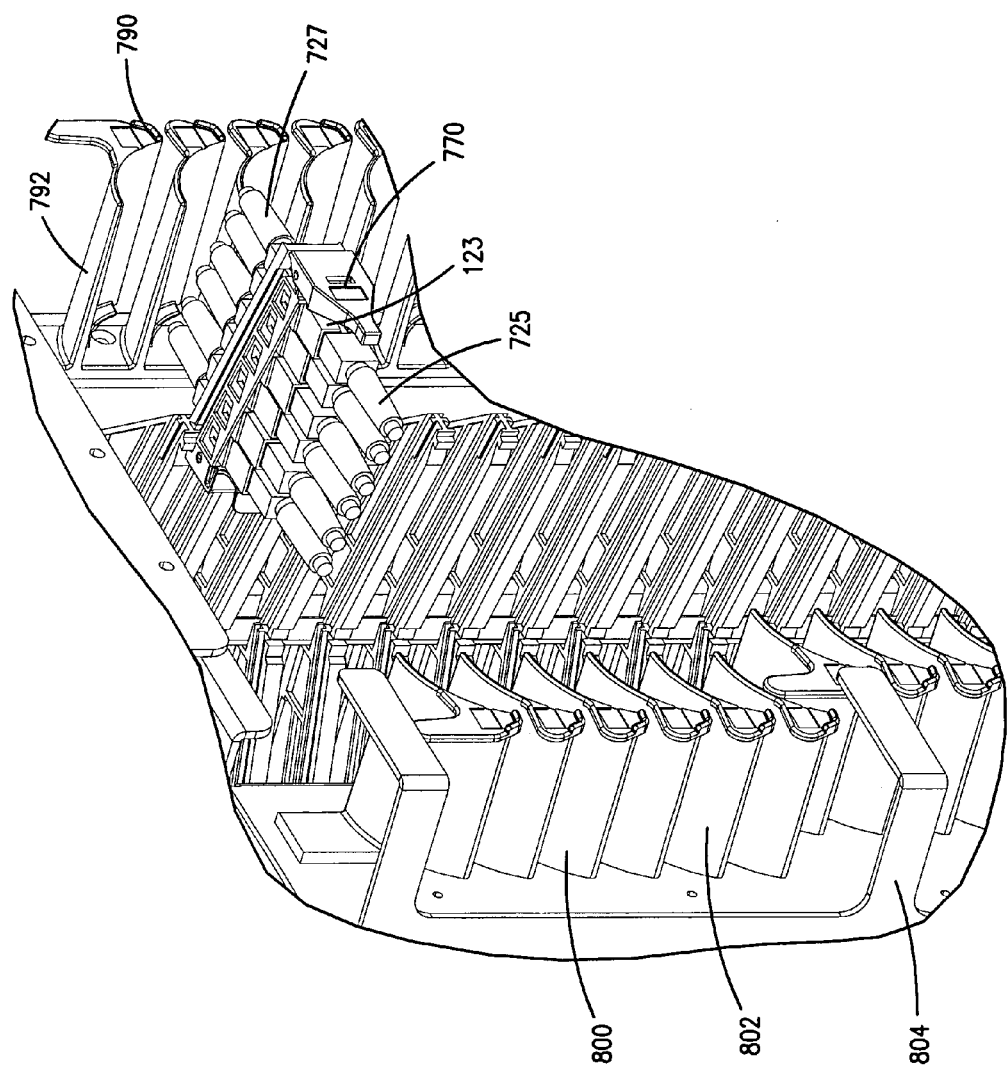
FIG. 32 is a close up of a portion of the fixture showing the front cable guide fingers and one of the movable adapter modules.
Figure 33:
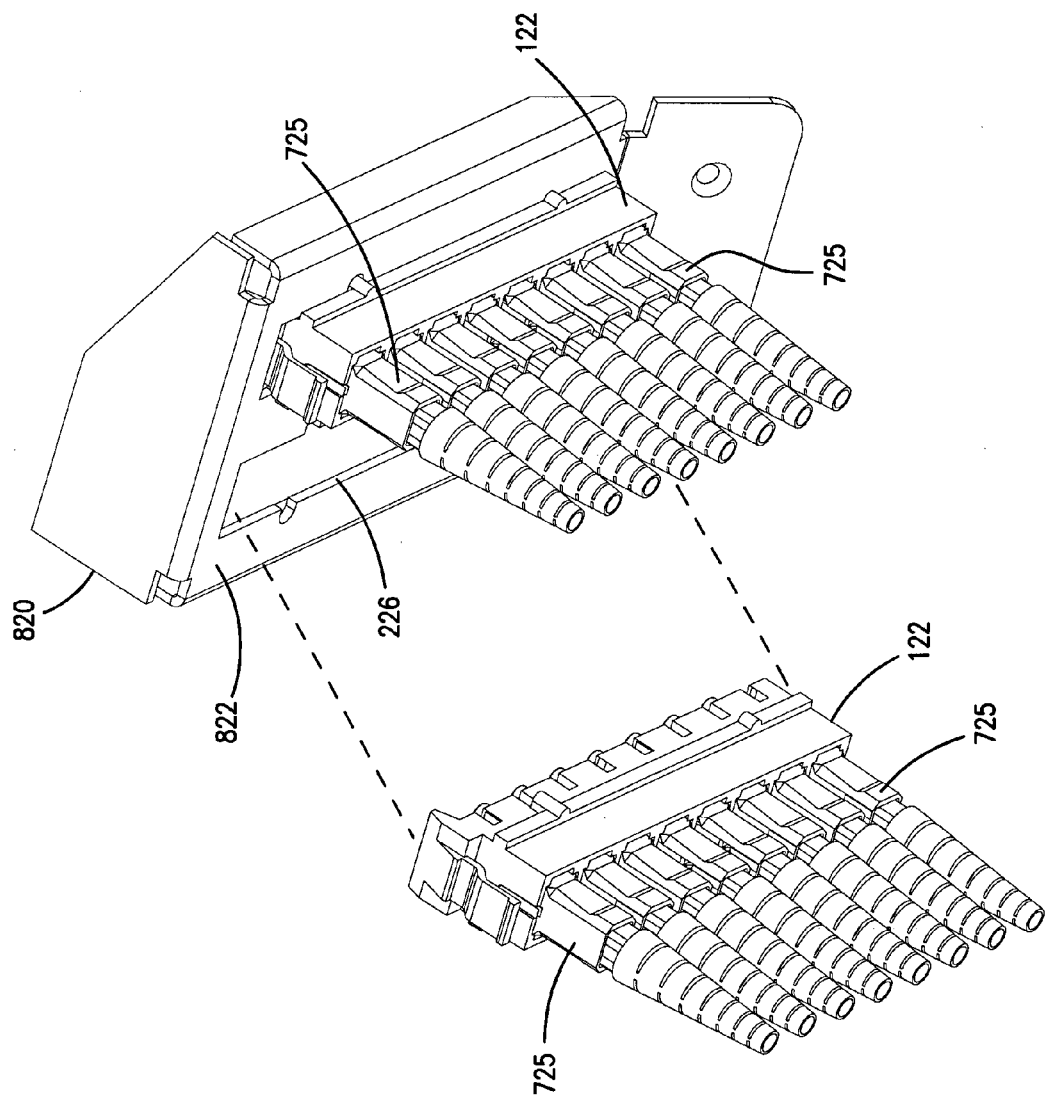
FIG. 33 is a close up of a portion of the connector storage panel.
Figure 36:
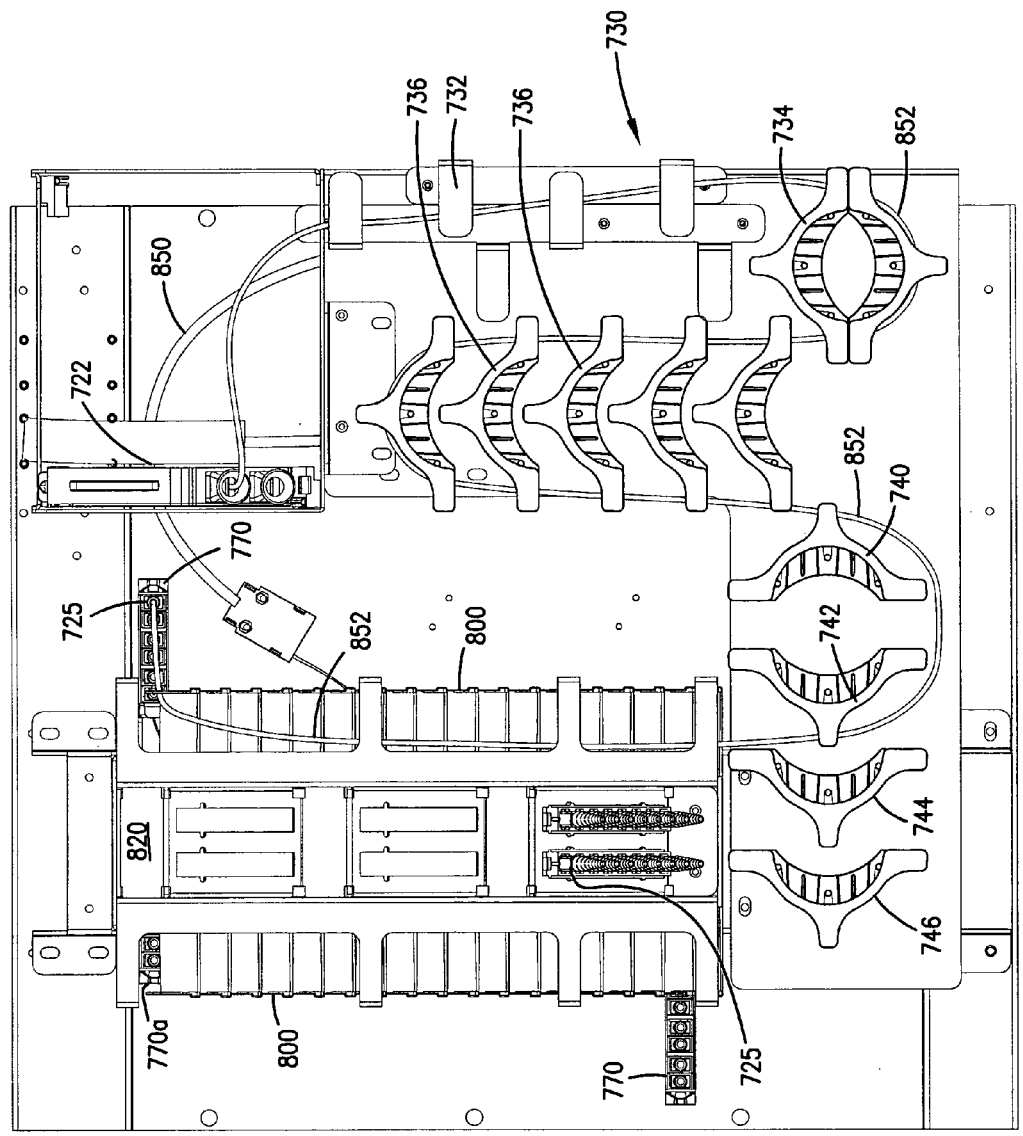
FIG. 36 is a front view of the interior components and cabling as shown in FIG. 35.

Adapters 123 are mounted on movable adapter modules 770 which are slideable from the extended position shown in the figures, to a retracted position along guides or walls 780. The adapters have been removed in FIGS. 23, 27, 28. Modules 770 includes lines of adapters 123 which move along lines of travel parallel to the lines of adapters. The line of travel 782 is shown in FIG. 26. In the preferred embodiment, two sets 772, 774 of adapter modules are provided, one which moves horizontally to the left, and the other which moves horizontally to the right. By moving a selected module 770 to the extended position along the line of travel, access to individual adapters 123 and connectors 725, 727 is easier, with less disruption to surrounding connectors and cables. Sliding adapter modules are described in greater detail in commonly owned U.S. Pat. Nos. 5,497,444; 5,717, 810; 5,758,003; and 6,591,051, the disclosures of which are hereby incorporated by reference. In the illustrated embodiment, only a few adapter modules 770 are shown. In preferred use, there is an adapter module 770 between each adjacent wall 780. Module 770a in FIGS. 26 and 36 is shown in the normal retracted position. Walls 780 define longitudinal guides which cooperate with guides on modules 770 to provide the linear movement.

Rear cables from modules 770 are managed by rear fingers or fanning guides 790 which include curved surfaces 792 to provide cable bend radius protection for cables directed downward. Front fingers or fanning guides 800 are positioned adjacent a front 768 of fixture 760 for managing the front cables extending toward adapter modules 770. Two fanning guides 800 are provided, one for each set 772, 774 of adapter modules 770. In the illustrated embodiment of fixture 760, vertical cable guides 804 are also positioned adjacent to both of front fanning guides 800. Front fanning guides 800 include curved surfaces 802 for cable bend radius protection for cables directed downward.

Front fanning guides 800 on each side of fixture 760 include a first set of fingers 806, and a second set of fingers 808 which is horizontally positioned back from the first set 806 a distance 810. Such set back of the first and second sets 806, 808 of fingers allows for cables managed by the fingers to not hang on top of one another. This makes accessing individual fingers or cables easier for the technician. Such set back creates vertical columns for the cables to hang. More sets of fingers offset from the two sets shown can be provided, if desired, to create more room for more cables for larger fixtures.

Fixture 760 also includes a parking lot or bulkhead 820 for storing connectors until needed for connection to the front of one of adapters 123. As noted above, such connection may not initially be needed, but may be desired at a later time. Bulkhead 820 includes openings 226 as described above for receiving connector holders 122 or adapters. In the illustrated embodiment, bulkhead 820 is positioned between cable guides 804 on front 768 of fixture 760. Bulkhead 820 includes a plurality of panel segments 822 which are angled downwardly. Such angling assists with cable management so that the cables do not bend 90 degrees or require cable supports to prevent excessive cable bending.

Figure 34:
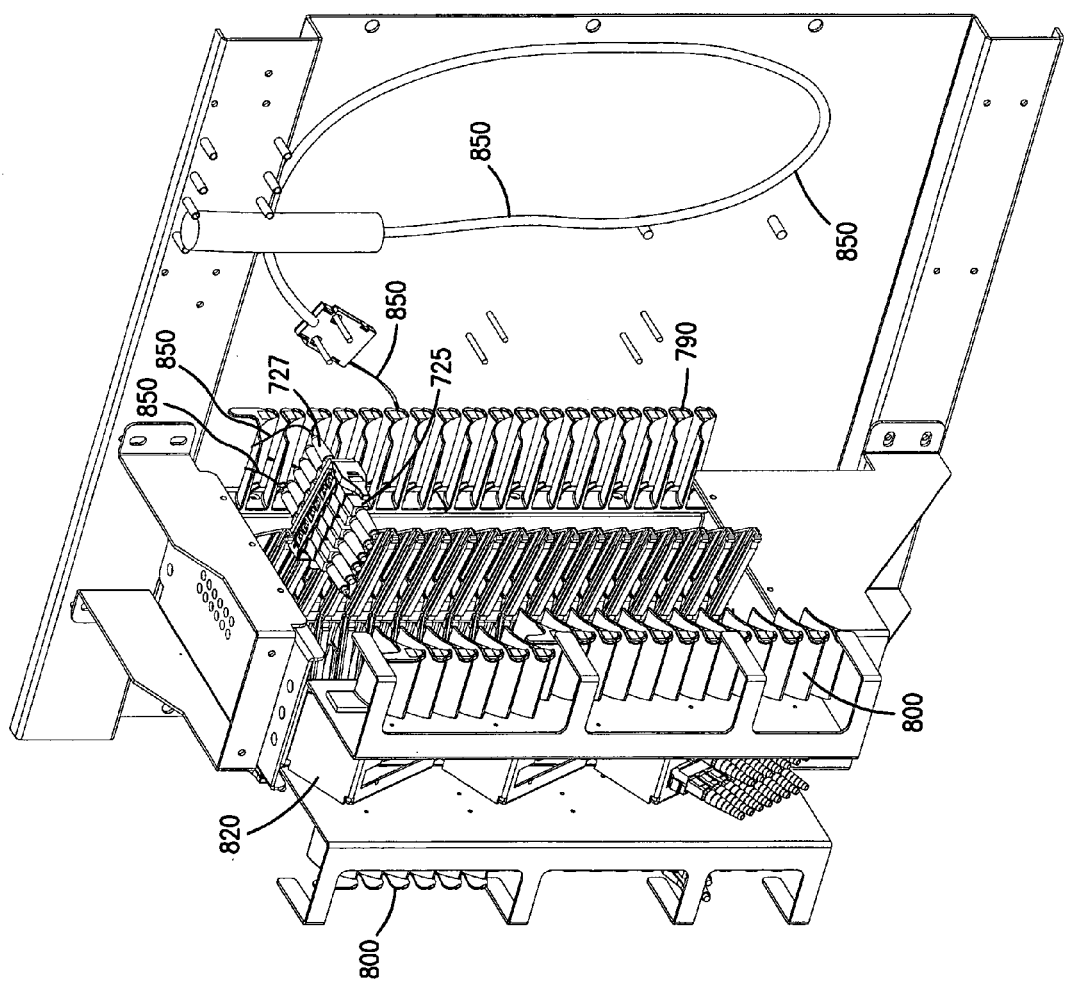
FIG. 34 is a perspective view like FIG. 27, showing exemplary rear cabling extending to one of the adapter modules.
Figure 35:
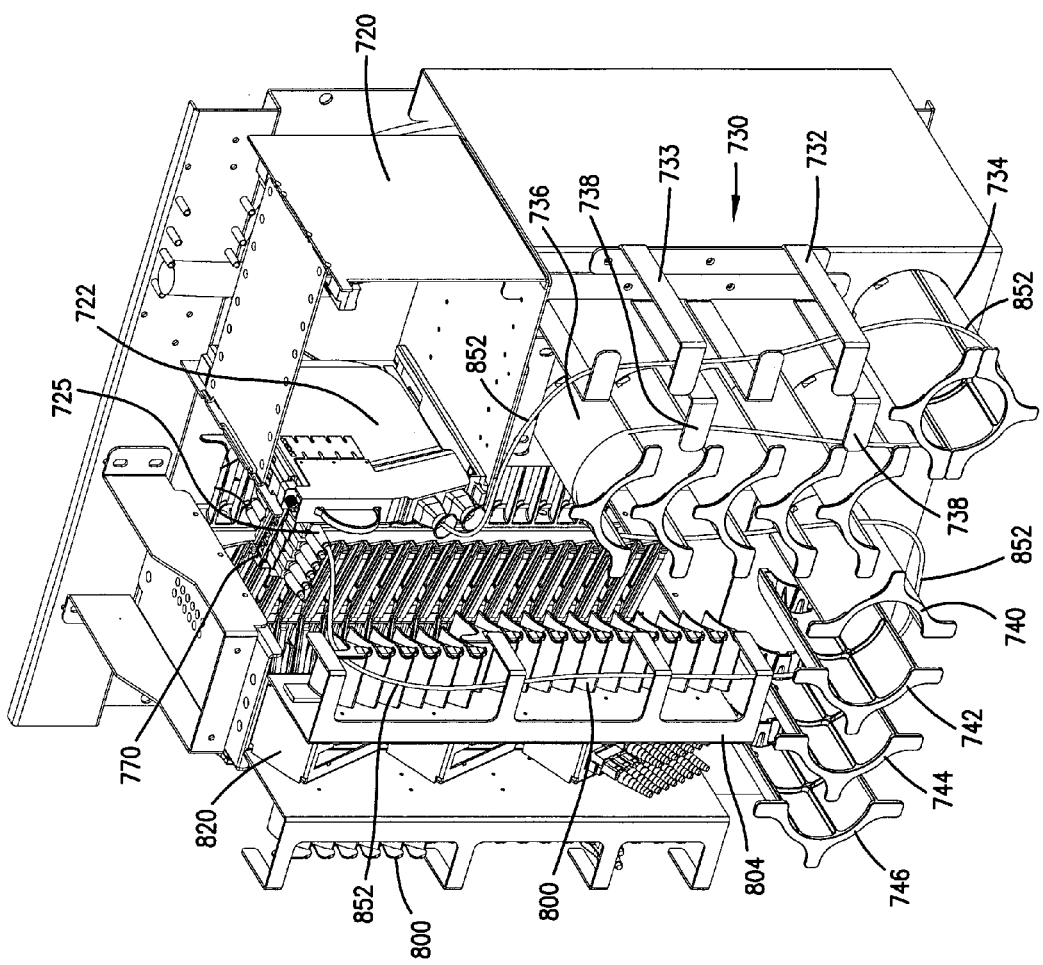
FIG. 35 is a front perspective view of the interior components like that shown in FIG. 23, showing exemplary front cabling extending to one of the adapter modules.

Referring now to FIGS. 34-36, exemplary cabling is shown with respect to the cabinet 700 and the interior features. Rear connectors 727 are connected to cables 850 which are connected to customer premises. Front connectors 725 are connected to cables 852 which extend to splitter 722. When a customer desires service, a connector 725 is removed from bulkhead 820. The selected adapter module 770 is pulled outward to the extended position, and the selected connector 725 is connected to the adapter 123 which connects connector 725 to a rear connector 727 connected to the specific customer premises needing service. The spooling of cable management area 730 is utilized to store any slack when the connectors are connected to the bulkhead 820, or the adapter module 770. The cable can be moved between spools when the connector is moved from the bulkhead 820 to one of the adapter modules 770. For example, the cable may be positioned around spool 744 when the connector 725 is positioned in bulkhead 820. When the cable is moved so as to allow connection to module 770, the cable is positioned around spool 742, and the remaining slack is positioned around the appropriate spools vertical spools 736. Spool 746 can be used for cables extended to the left side adapter modules 770. Spool 742 can be used for cables extended to the right side adapter modules 770. Spool 744 can be used for cables extended to bulkhead 820.

The above specification, examples and data provide a complete description of the manufacture and use of the invention. Since many embodiments of the invention can be made without departing from the spirit and scope of the invention, the invention resides in the claims hereinafter appended.

What is claimed is:

1. A telecommunications connection cabinet comprising:
a top, a floor, a pair of opposing sides, a front and a rear defining an interior, the front including an opening for accessing the interior;
a fiber optic splitter receiving a first fiber optic cable and splitting an optical signal carried by the cable into a plurality of fiber distribution cables, each fiber distribution cable terminated by a fiber optic connector and a polished end face;
a first fiber connection panel including a plurality of fiber optic adapters and a second fiber storage panel including a plurality of openings, the second fiber storage panel having a front side and a rear side;
the adapters of the first panel configured to optically connect two optical fiber cables terminated with fiber optic connectors, one cable on a rear side of the adapter and one cable on a front side of the adapter, the adapters mounted in groups on modules, each module movably mounted on the first panel along a line of travel, the group of adapters on each module linearly disposed along the line of travel for each module;
at least one housing mounted within one of the openings of the second panel, the housing including a plurality of connector holder openings, each connector holder opening accessible through the front opening and configured to receive one of the fiber optic connectors and protect the polished end face of the connector from contamination, the housings adapted to be inserted into the openings of the second panel through the front side, and the openings of the housing accessible from a front side of the second panel, the second panel mounted to the first panel;
a first plurality of spools positioned vertically below the first fiber connection panel, the first plurality of spools defining a horizontal row of spools.

2. The telecommunications connection cabinet of claim 1, further comprising a second plurality of spools positioned within the interior of the cabinet, the second plurality of spools defining a vertical row of spools.

3. The telecommunications connection cabinet of claim 1, wherein the lines of travel of the modules are horizontal.

4. The telecommunications connection cabinet of claim 3, wherein a first plurality of the modules move horizontally toward one side of the cabinet, and a second plurality of the modules move horizontally toward the other side of the cabinet.

5. The telecommunications connection cabinet of claim 4, wherein the second panel includes a plurality of staggered sections, each section facing partially vertically downwardly.

6. The telecommunications connection cabinet of claim 5, wherein the second panel is mounted to a front of the first panel.

7. The telecommunications connection cabinet of claim 1, further comprising a vertical arrangement of cable management fingers positioned on the first fiber connection panel, the vertical arrangement including a first set of fingers and a second set of fingers horizontally offset from the first set of fingers to define two vertical columns for cables to be located, the two vertical columns offset in a direction from the front of the cabinet toward the rear.

8. A telecommunications connection cabinet comprising:
a top, a floor, a pair of opposing sides, a front and a rear defining an interior, the front including an opening for accessing the interior;
a fiber optic splitter receiving a first fiber optic cable and splitting an optical signal carried by the cable into a plurality of fiber distribution cables, each fiber distribution cable terminated by a fiber optic connector and a polished end face;
a first fiber connection panel including a plurality of fiber optic adapters and a second fiber storage panel including a plurality of openings, the second fiber storage panel having a front side and a rear side;
the adapters of the first panel configured to optically connect two optical fiber cables terminated with fiber optic connectors, one cable on a rear side of the adapter and one cable on a front side of the adapter, the adapters mounted in groups on modules, each module movably mounted on the first panel along a line of travel, the group of adapters on each module linearly disposed along the line of travel for each module;
at least one housing mounted within one of the openings of the second panel, the housing including a plurality of connector holder openings, each connector holder opening accessible through the front opening and configured to receive one of the fiber optic connectors and protect the polished end face of the connector from contamination, the housings adapted to be inserted into the openings of the second panel through the front side, and the openings of the housing accessible from a front side of the second panel, the second panel mounted to the first panel;

a vertical arrangement of cable management fingers positioned on the first fiber connection panel, the vertical arrangement including a first set of fingers and a second set of fingers horizontally offset from the first set of fingers to define two vertical columns for cables to be located, the two vertical columns offset in a direction from the front of the cabinet toward the rear.

* * * * *